United States Patent
Niikura et al.

(10) Patent No.: US 9,268,412 B2
(45) Date of Patent: Feb. 23, 2016

(54) INPUT APPARATUS HAVING AN INPUT RECOGNITION UNIT AND INPUT RECOGNITION METHOD BY USING THE SAME

(75) Inventors: Hideo Niikura, Tokyo (JP); Hidetoshi Kabasawa, Saitama (JP); Toshio Mamiya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 711 days.

(21) Appl. No.: 13/613,917

(22) Filed: Sep. 13, 2012

(65) Prior Publication Data

US 2013/0088422 A1  Apr. 11, 2013

(30) Foreign Application Priority Data

Oct. 5, 2011  (JP) .................................. 2011-220771

(51) Int. Cl.
G06F 13/12 (2006.01)
G09G 5/00 (2006.01)
G06F 3/03 (2006.01)
G06F 3/01 (2006.01)

(52) U.S. Cl.
CPC .............. G06F 3/0304 (2013.01); G06F 3/017 (2013.01)

(58) Field of Classification Search
CPC ............................... G06F 3/0304; G06F 3/017
See application file for complete search history.

(56) References Cited

U.S. PATENT DOCUMENTS

| | | | | |
|---|---|---|---|---|
| 6,160,899 A * | 12/2000 | Lee et al. | | 382/103 |
| 6,771,277 B2 * | 8/2004 | Ohba | | 345/629 |
| 2002/0015094 A1 * | 2/2002 | Kuwano et al. | | 348/143 |
| 2006/0086815 A1 * | 4/2006 | Kang | | 236/94 |
| 2008/0244465 A1 * | 10/2008 | Kongqiao et al. | | 715/863 |
| 2009/0060292 A1 * | 3/2009 | Sukegawa | | 382/118 |
| 2009/0077504 A1 * | 3/2009 | Bell et al. | | 715/863 |
| 2010/0204953 A1 * | 8/2010 | Onishi et al. | | 702/150 |
| 2011/0107216 A1 * | 5/2011 | Bi | | 715/716 |
| 2012/0146903 A1 * | 6/2012 | Arihara et al. | | 345/158 |

FOREIGN PATENT DOCUMENTS

JP  2001-282456  10/2001

OTHER PUBLICATIONS

"Integrating Paper and Digital Information on EnhancedDesk: A Method for Realtime Finger Tracking on an Augmented Desk System" by Hideki Koike, Yoichi Sato, Yoshinori Kobayashi, ACM Transactions on Computer-Human Interaction, vol. 8, No. 4, Dec. 2001.*

* cited by examiner

*Primary Examiner* — Henry Tsai
*Assistant Examiner* — Jing-Yih Shyu
(74) *Attorney, Agent, or Firm* — Hazuki International, LLC

(57) ABSTRACT

Provided is an input apparatus, including: an infrared camera; an image capture unit configured to sequentially capture a plurality of temperature distribution images photographed at predetermined time intervals by the infrared camera; and an input recognition unit configured to detect, from among the plurality of temperature distribution images captured by the image capture unit, pairs of skin temperature image portions each corresponding to a temperature of skin of a person, recognize, from among the pairs of skin temperature image portions thus detected, pairs of skin temperature image portions as pairs of detection target images, from among which motions are observed, and recognize an operation input based on states of the motions of the pairs of detection target images.

17 Claims, 27 Drawing Sheets

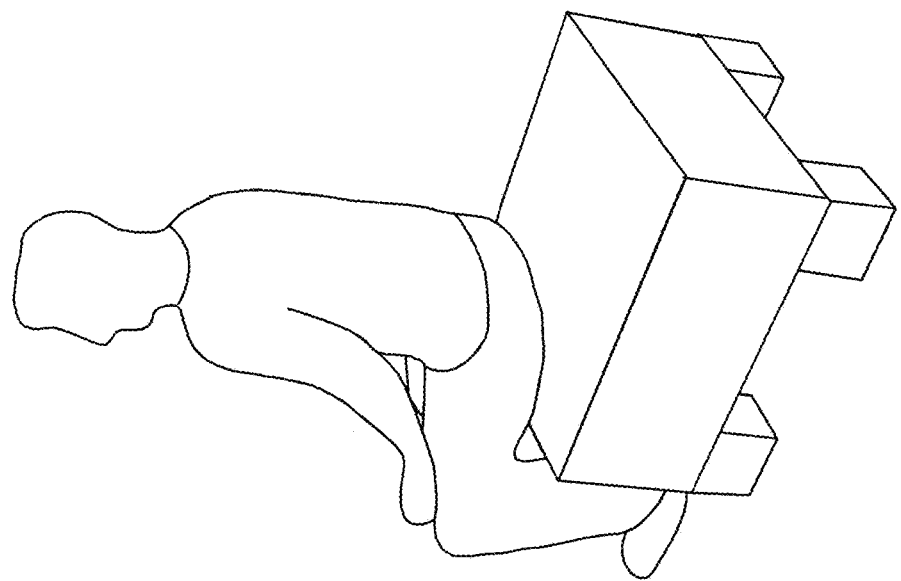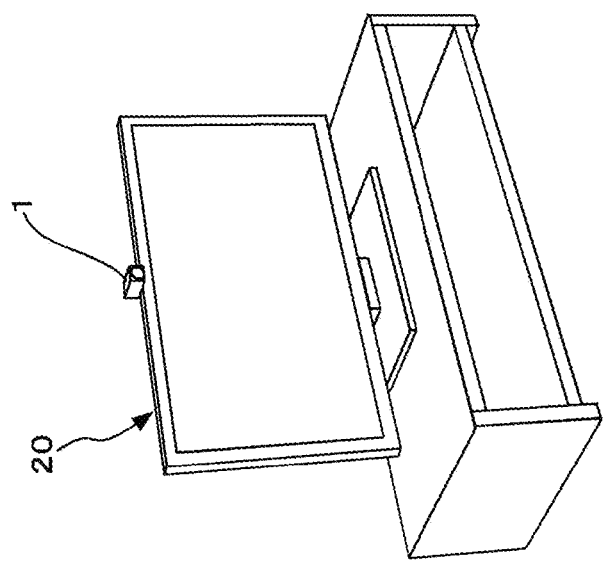
FIG. 1

Example of image photographed by infrared camera

Binary image

FIG.8
Frame N
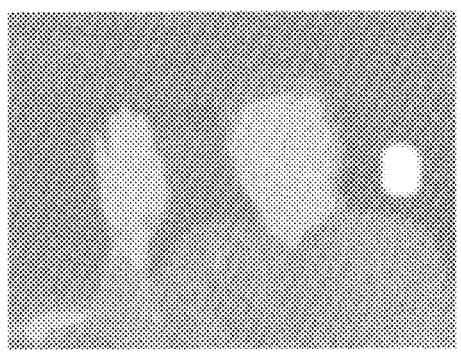
Pic-a
(Image obtained by binarization with respect to temperature near body temperature)
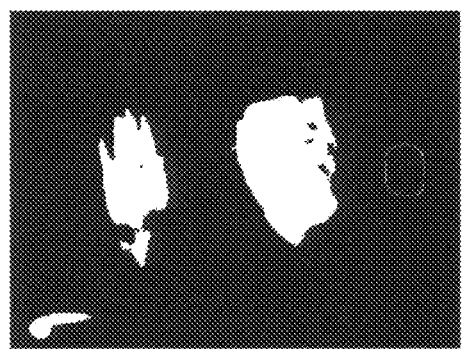
Frame N+1
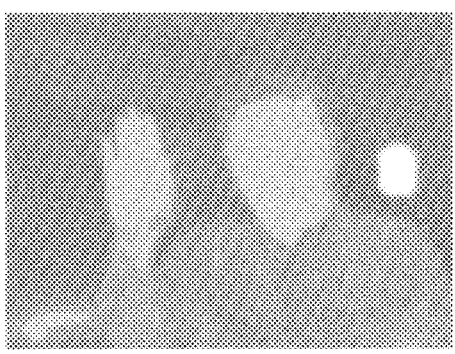
Pic-b
(Image obtained by binarization with respect to temperature near body temperature)
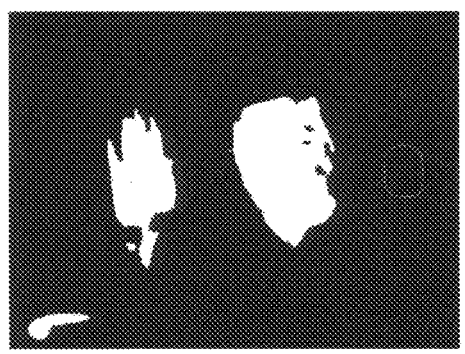

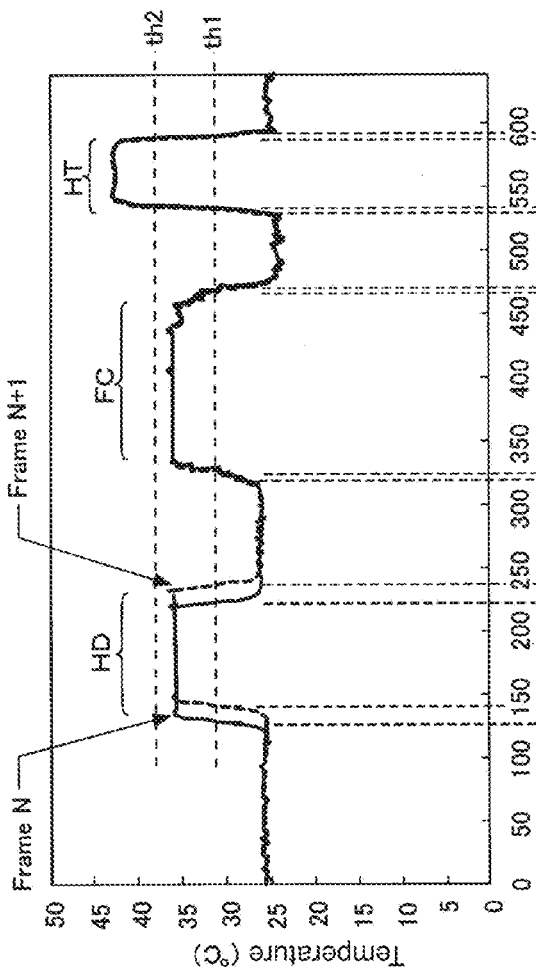
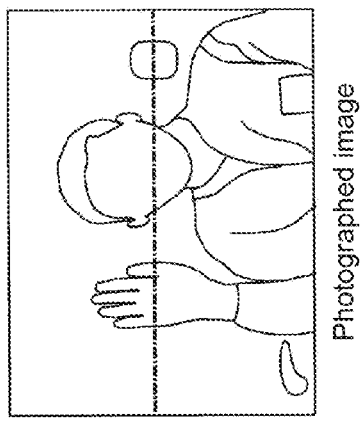
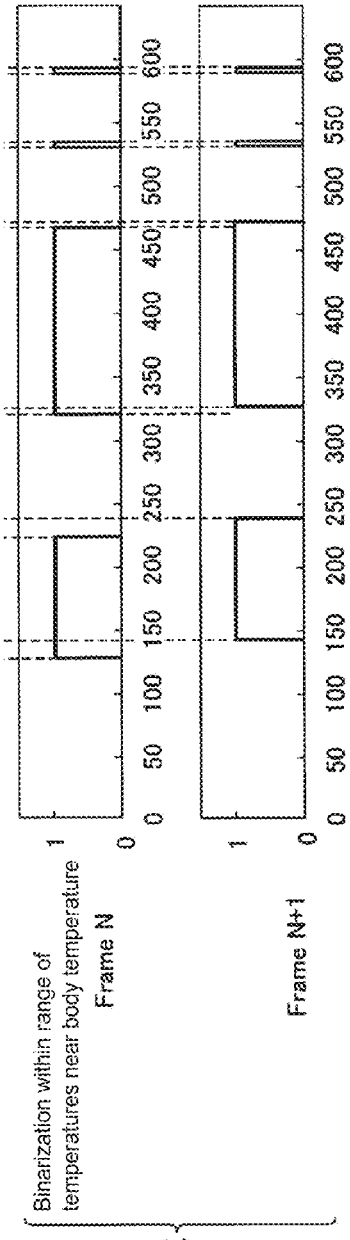

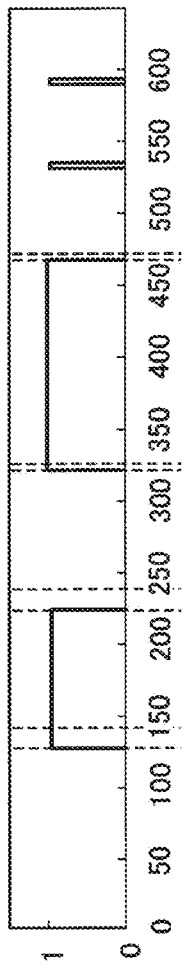
FIG. 11A Binary image Pic-a
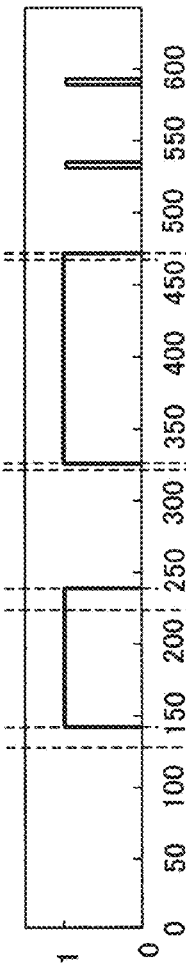
FIG. 11B Binary image Pic-b
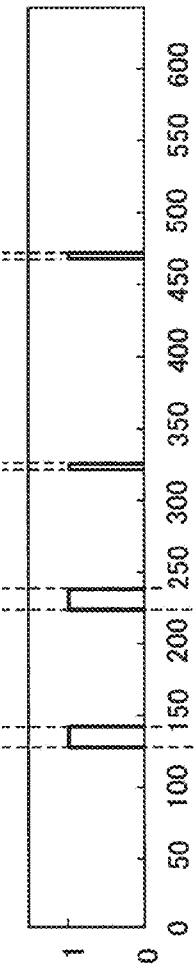
FIG. 11C Difference image Pic-c
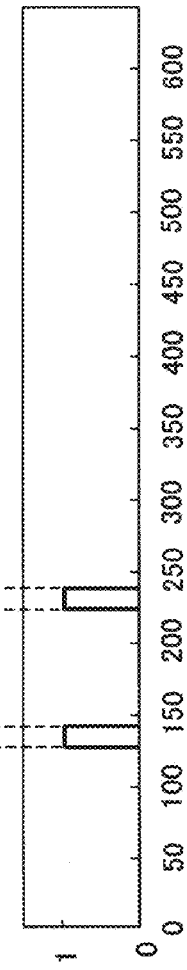
FIG. 11D Pic-d

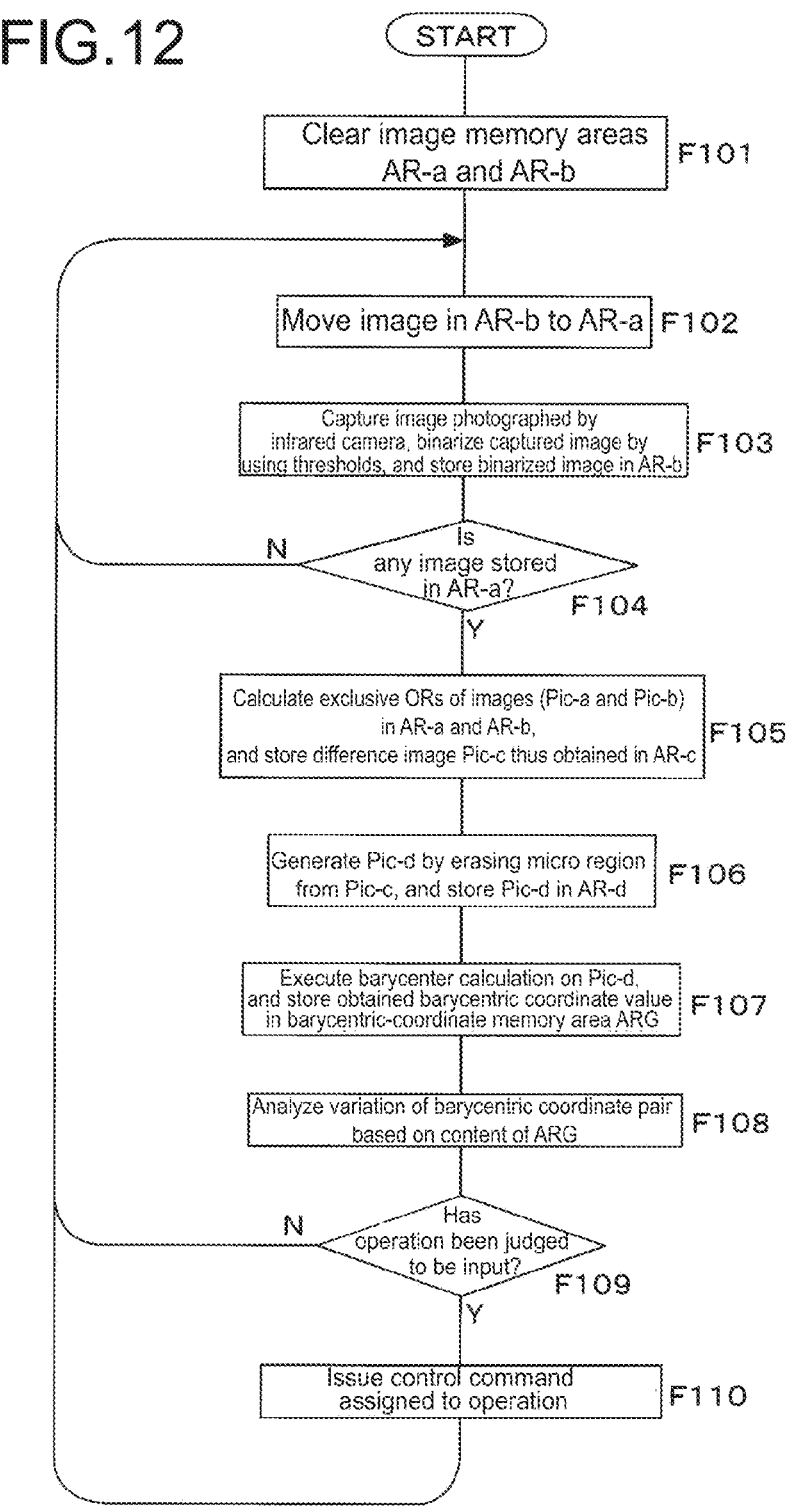

Photographed image

Photographed image

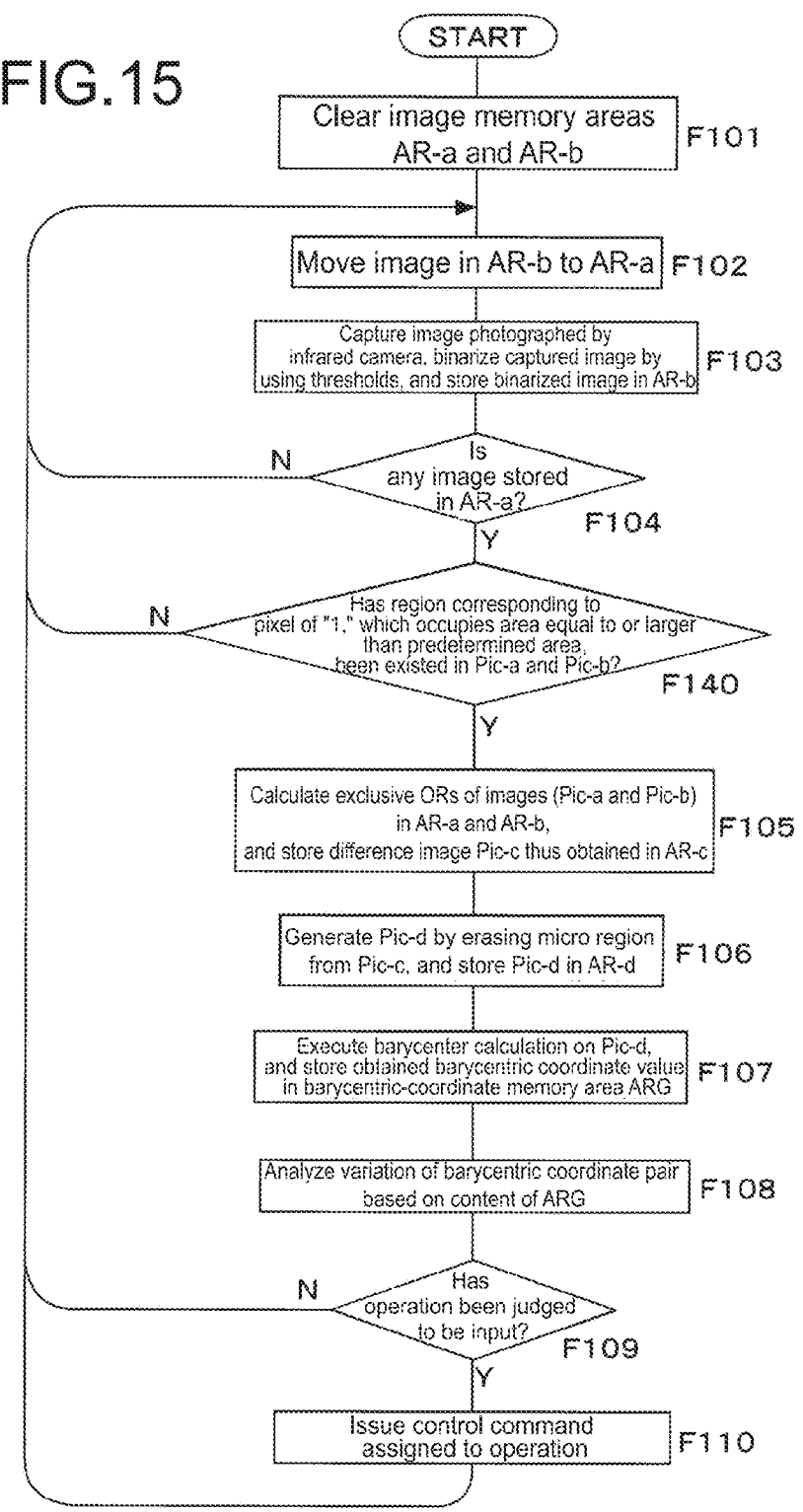

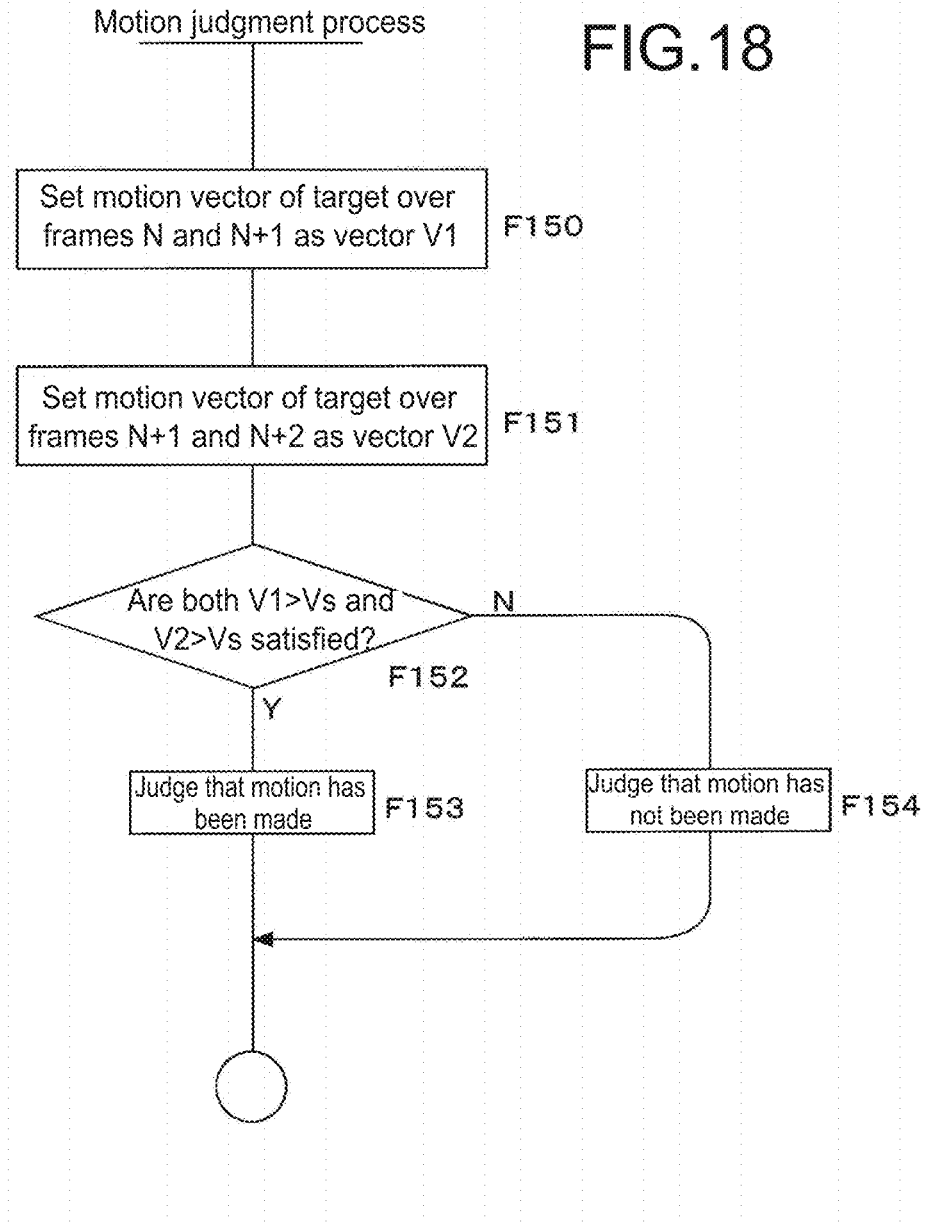

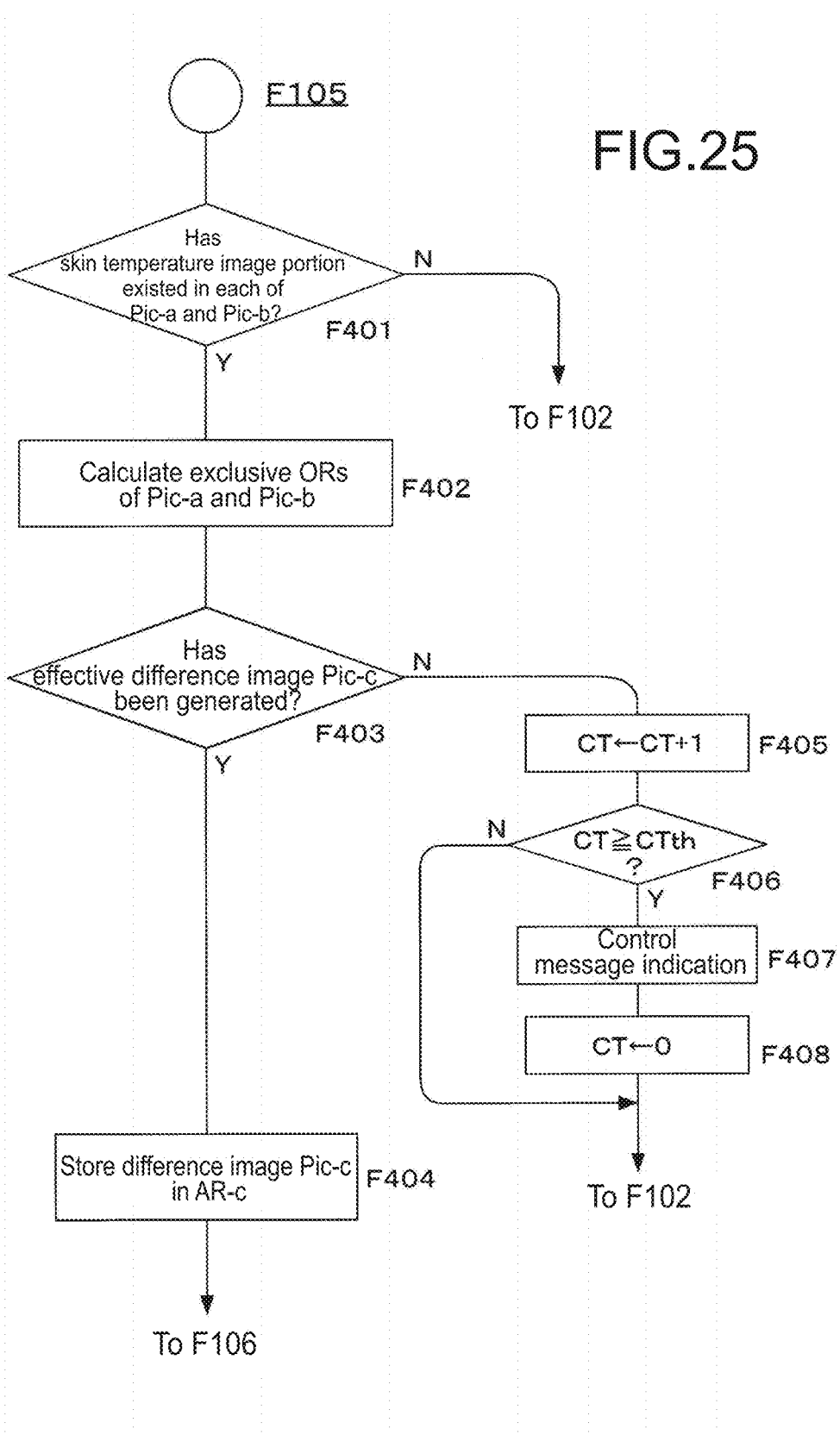

INPUT APPARATUS HAVING AN INPUT RECOGNITION UNIT AND INPUT RECOGNITION METHOD BY USING THE SAME

CROSS REFERENCES TO RELATED APPLICATIONS

The present application claims priority to Japanese Patent Application No. 2011-220771 filed on Oct. 5, 2011, the disclosure of which is incorporated herein by reference.

BACKGROUND

The present disclosure relates to an input apparatus and an input recognition method. More specifically, the present disclosure relates to an apparatus configured to detect, for example, gesture operations of a user, and a technology of recognition of inputs of the gesture operations.

As a technology of providing a desktop man-machine interface, Japanese Patent Application Laid-open No. 2001-282456 discloses a method of operating an apparatus by calculating a coordinate pair of a fingertip position specified by performing pattern matching utilizing features of a shape of the fingertip based on images of a hand on a desk, which are photographed by an infrared camera.

SUMMARY

It is desirable to enable a user to perform an operation input by performing, for example, an operation of waving or moving his/her hand in a space with respect to an electronic apparatus such as a television receiver (hereinafter, such operations are collectively referred to as "gesture").

In this case, it is conceived that a user is photographed by a camera set to the television receiver or the like, and motions of the hand of the user are judged based on the photographed images. However, unlike the technology disclosed in Patent Document 1 above, when targets other than those on the desk are observed, various objects are observed. Examples of such objects include, in addition to the hand of the user, the face, the body, furniture items therearound, and electric lamps.

When such a situation is expected, it is necessary to judge, for example, a motion of the hand as a gesture of the user from among various objects photographed by the camera, and reflect the motion in the operation input.

For example, in the technology disclosed in Japanese Patent Application Laid-open No. 2001-282456, an image of the hand is extracted from among images photographed by the infrared camera based on body temperature of a person. However, if operations are performed not on the desk but in the space, the face part and the like are extracted together.

Thus, in order to extract the hand part, it is necessary to execute complicated imaging processes such as extraction of a shape feature of the hand from among the various objects. In accordance therewith, a configuration of a processing apparatus becomes complicated, and a processing time period becomes longer. This contradicts an advantage of easily extracting a detection target with use of the infrared camera.

Further, similar problems arise also in a case where objects having temperatures equivalent to or higher than body temperature (such as a heating appliance and a light bulb) exist in a photographing range of the infrared camera.

In view of the above-mentioned circumstances, there is a need to enable the input apparatus using an infrared camera to recognize the gestures made by a user in a space accurately as operations without executing a complicated process.

According to an embodiment of the present disclosure, there is provided an input apparatus, including:
an infrared camera;
an image capture unit configured to sequentially capture a plurality of temperature distribution images photographed at predetermined time intervals by the infrared camera; and
an input recognition unit configured
to detect, from among the plurality of temperature distribution images captured by the image capture unit, pairs of skin temperature image portions each corresponding to a temperature of skin of a person,
to recognize, from among the pairs of skin temperature image portions thus detected, pairs of skin temperature image portions as pairs of detection target images, from among which motions are observed, and
to recognize an operation input based on states of the motions of the pairs of detection target images.

According to another embodiment of the present disclosure, there is provided an input recognition method, including:
sequentially capturing a plurality of temperature distribution images photographed at predetermined time intervals by an infrared camera;
detecting, from among the plurality of temperature distribution images thus captured, pairs of skin temperature image portions each corresponding to a temperature of skin of a person;
recognizing, from among the pairs of skin temperature image portions thus detected, pairs of skin temperature image portions as pairs of detection target images, from among which motions are observed; and recognizing an operation input based on states of the motions of the pairs of detection target images.

In other words, according to the embodiments of the present disclosure, by detecting, from each of the plurality of temperature distribution images photographed by the infrared camera, a pair of skin temperature image portions each corresponding to the temperature of the skin of a person, for example, the "hand" that has made a gesture for an operation input can be easily recognized. However, only with reference to the temperature of the skin, parts such as the face of the person, which is irrelevant to the gesture operation, are recognized together as another pair of skin temperature image portions. As a countermeasure, from among the pairs of skin temperature image portions, the pair of skin temperature image portions, from among which a motion is observed, are recognized as a pair of detection target images (images of a detection target performing the gesture operation, such as the hand). Then, an operation input is recognized based on a state of the motion of the pair of detection target images.

According to the embodiments of the present disclosure, there is achieved an advantage that gesture operations performed in a space by a user can be recognized through a simple process and with high accuracy based on images photographed by using an infrared camera.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 1 is an explanatory diagram illustrating how an operator faces an electronic apparatus in an operating method according to embodiments of the present disclosure.

FIG. 8 is an explanatory view of the temperature distribution images and the binary images according to the embodiments.

FIG. 10 are explanatory diagrams illustrating a binary process according to the embodiments.

FIG. 11 are explanatory diagrams illustrating processes on the difference image according to the embodiments.

FIG. 12 is a flowchart showing an input recognition process according to a first embodiment.

FIG. 15 is a flowchart showing an input recognition process according to a second embodiment.

FIG. 18 is a flowchart of a motion judgment process according to the third embodiment.

FIG. 25 is a flowchart of an input recognition process according to the sixth embodiment, in a case where a message is indicated.

DETAILED DESCRIPTION

Figure 2A:
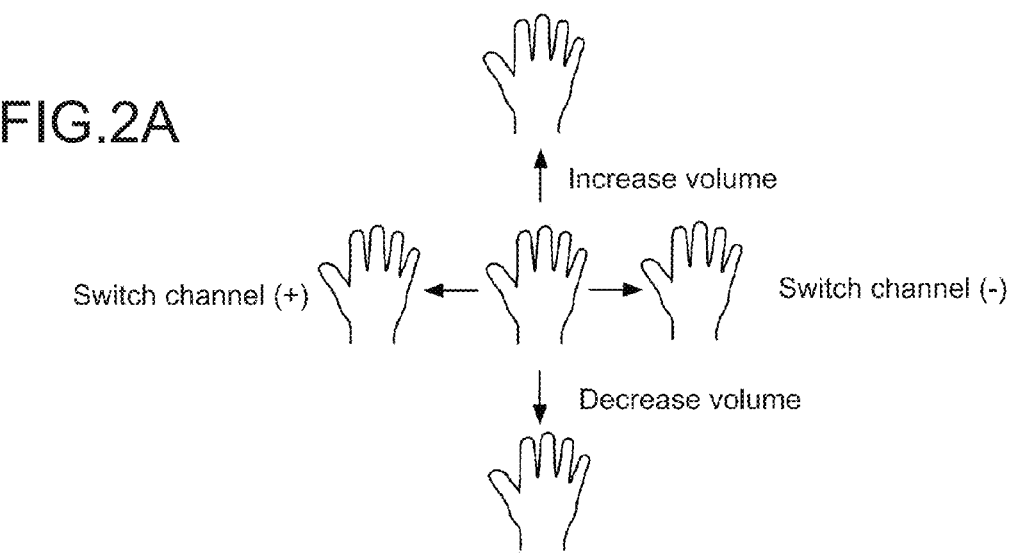
FIG. 2 are explanatory diagrams illustrating examples of a gesture operation according to the embodiments.

Embodiments of the present application will be described below in detail with reference to the drawings.

Hereinafter, embodiments of the present disclosure will be described in the following order with reference to the drawings.

1. Summary of gesture input
2. Configuration of input apparatus
3. First Embodiment
3-1: Input recognition method
3-2: Input recognition process
3-3: Position of infrared camera
4. Second Embodiment
5. Third Embodiment
6. Fourth Embodiment
7. Fifth Embodiment
8. Sixth Embodiment
9. Seventh Embodiment
10. Modifications Note that, in the embodiments, an input apparatus incorporated in a television receiver is illustrated as an example. The input apparatus recognizes gesture operations corresponding to motions of a user's hand. In this example, a control unit of the television receiver controls various functions in accordance with the operations recognized by the input apparatus.

Further, meanings of terms used in the embodiments are defined as follows.

Temperature distribution image: an image photographed by an infrared camera, in which each pixel has a pixel value corresponding to a temperature of an object.

Skin temperature image portion: an image part (pixel region) corresponding to a temperature of the skin of a person in the temperature distribution image.

Detection target image: a part of the skin temperature image portion, which corresponds to an image of an object to be used for judgment of a motion state, that is, an image of a target to be used for recognition of a gesture operation. In the embodiments of the present disclosure, an image of a user's hand corresponds to the detection target image. Note that, an object that appears as the detection target image (for example, the user's hand) in each of the temperature distribution images is referred to as a "detection target."

1. Summary of Gesture Input

FIG. 1 illustrates a television receiver 20 provided with an input apparatus of this example, and a user viewing the television receiver 20. An infrared camera 1 is arranged, for example, on an upper side of a chassis of the television receiver 20. This infrared camera 1 constitutes a part of the input apparatus of this example. The infrared camera 1 photographs the user. The input apparatus of this example, which is incorporated in the television receiver 20, detects gestures of the user based on photographed images of frames successively photographed by the infrared camera 1 (temperature distribution images), and recognizes operations of the user based on what kind of gesture has been made.

FIG. 2 illustrate examples of the gesture operations.

FIG. 2A illustrates an example in which volume and channels are controlled with the gesture operations. For example, a volume up operation is performed when the user moves his/her hand upward with respect to the television receiver 20 side (in other words, the infrared camera 1 side) and a volume down operation is performed when the hand is moved downward. Further, a channel up operation is performed by moving the hand to the left, and a channel down operation is performed by moving the hand to the right.

In this way, in a case where operation contents have been assigned to various gesture modes in advance and the input apparatus has recognized that a user's gesture corresponds to any of these contents, the input apparatus recognizes the gesture as a corresponding operation content (volume control and channel selection).

Figure 2B:
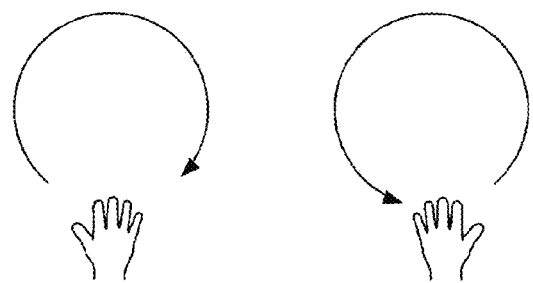

As a matter of course, FIG. 2A merely illustrates an example, and other various gesture modes and operation contents may be employed. FIG. 2B illustrates an example in which the user draws a clockwise circle and a counterclockwise circle, and particular operation contents such as volume up/down may be assigned to such gesture modes.

Alternatively, although not shown, as a matter of course, still other various gesture modes such as waving the hand left and right, waving the hand back and forth, moving the hand in a triangular fashion, and moving the hand in a Z fashion may be assigned to particular operations.

2. Configuration of Input Apparatus

Figure 3:
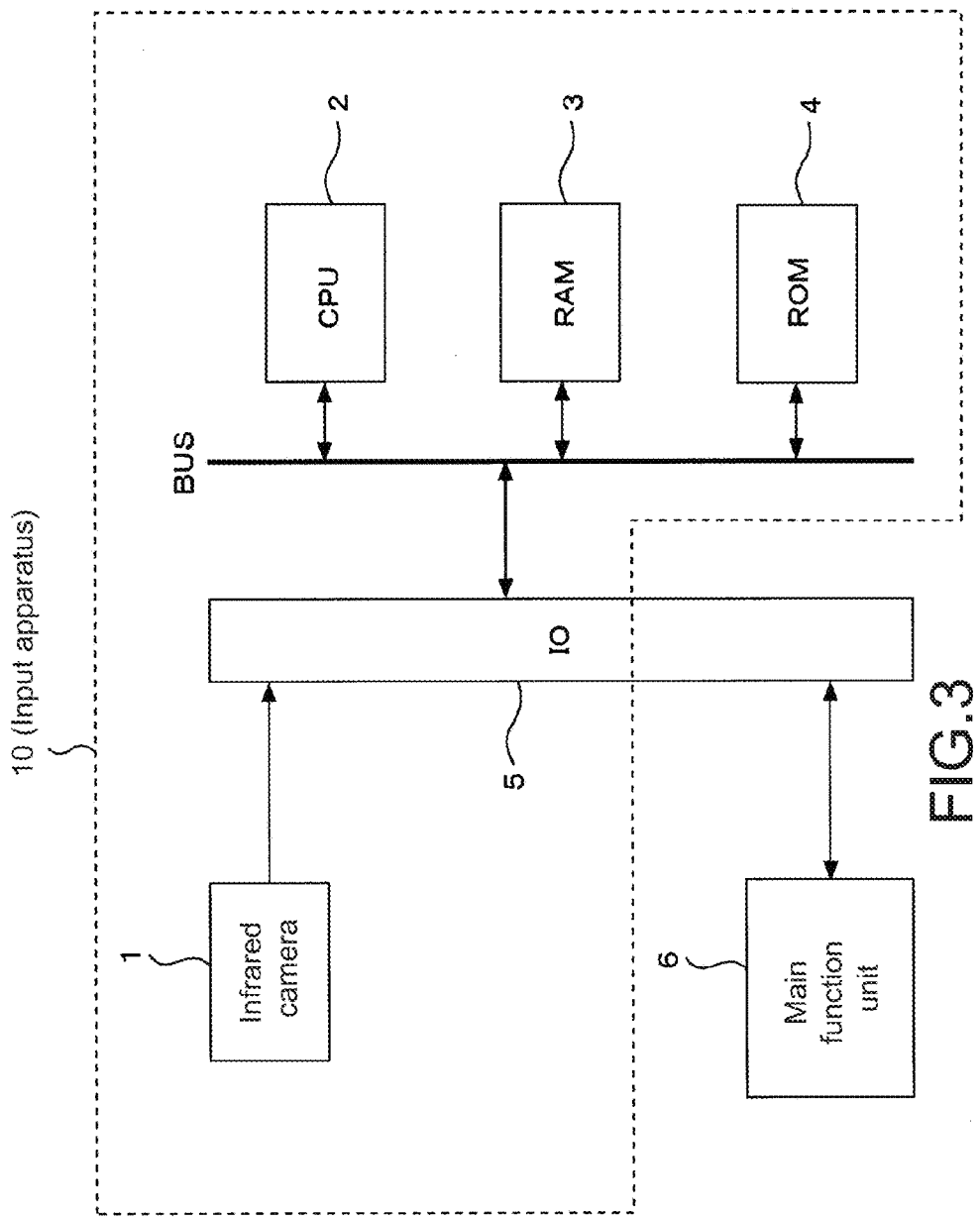
FIG. 3 is a block diagram of an input apparatus according to the embodiments.

FIG. 3 shows a configuration of an input apparatus 10 of this example, which is incorporated in the television receiver 20.

FIG. 3 mainly shows an internal configuration of the television receiver 20, specifically, a part corresponding to the input apparatus 10.

As illustrated in FIG. 3, the television receiver 20 incorporates the infrared camera 1, a CPU (Central Processing Unit) 2, a RAM (Random Access Memory) 3, a ROM (Read Only Memory) 4, an input/output (I/O port) 5, a main function unit 6, and a BUS configured to connecting those units to each other.

The infrared camera 1 is provided, for example, on the upper side of the chassis of the television receiver 20 as illustrated in FIG. 1, and photographs the user's side as an object. In this way, the temperature distribution image on the user's side is obtained.

The main function unit 6 collectively refers to main function parts of the television receiver 20. Specifically, the main function unit 6 includes general components provided to the television receiver 20, such as a tuner unit, a decoder unit configured to receive and decode broadcast signals, a processing unit configured to process the decoded video/audio signals, a display drive unit, a display unit, and an audio output unit.

The CPU 2, the RAM 3, and the ROM 4 are provided to execute various processes of the control unit of the television receiver 20, and in addition, also serve as components of the input apparatus 10 of this example.

The CPU 2 collectively controls the television receiver 20 as a whole by executing programs stored in the ROM 4, for example. Specifically, the CPU 2 effectively controls by sending control commands and control data to the main function unit 6 via the I/O port 5 in response to the user's operations and the programs so that operations necessary in the main function unit 6 are executed. In addition, the CPU 2 also has a function to recognize gesture operations so that functions of the input apparatus 10 of this example are exerted.

The RAM 3 is used as a storage region necessary for various processes of the CPU 2, such as storing of various data items and processing coefficients, development of programs, and working regions. Further, as the functions of the input apparatus 10, the RAM 3 also stores the temperature distribution image photographed by the infrared camera 1, images generated during an input recognition process, barycentric coordinate values, and the like.

The ROM 4 stores the programs to be executed by the CPU 2, fixed coefficient values, adjustment values, and the like.

Figure 4:
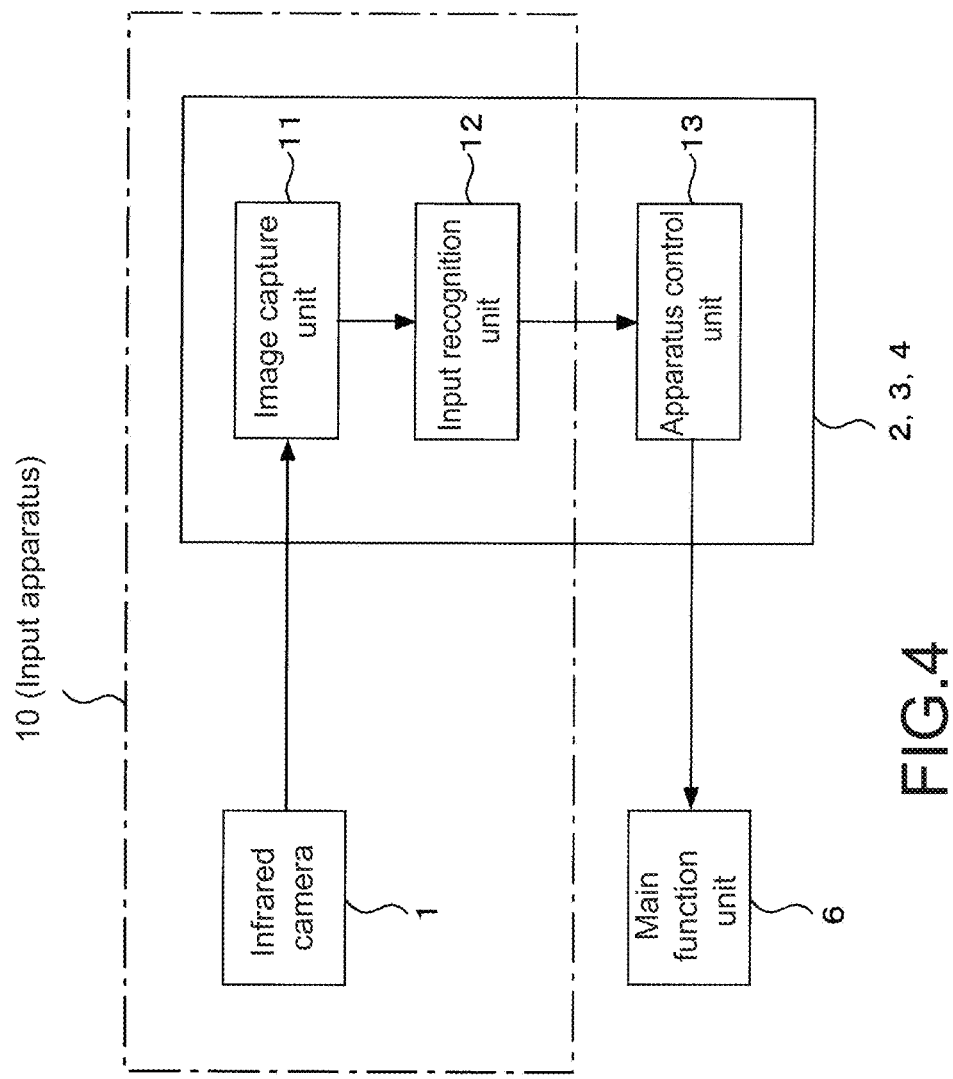
FIG. 4 is a block diagram of a functional configuration of the input apparatus according to the embodiments.

FIG. 4 shows the configuration of the input apparatus 10 from a functional viewpoint, that is, the functions of the CPU 2, the RAM 3, and the ROM 4.

The CPU 2, the RAM 3, and the ROM 4 constitute an image capture unit 11, an input recognition unit 12, and an apparatus control unit 13.

The image capture unit 11 captures temperature distribution images photographed by the infrared camera 1 at a predetermined time interval. For example, the temperature distribution images are captured at one frame interval.

Specifically, data items of the photographed images photographed by the infrared camera 1 on a frame basis (temperature distribution images) are stored in the RAM 3 via the I/O PORT 5. As a result, the CPU 2 can execute necessary processes on the temperature distribution images. The image capture unit 11 refers to such a part in which the functions of the RAM 3 and the CPU 2 are exerted.

Figure 5:
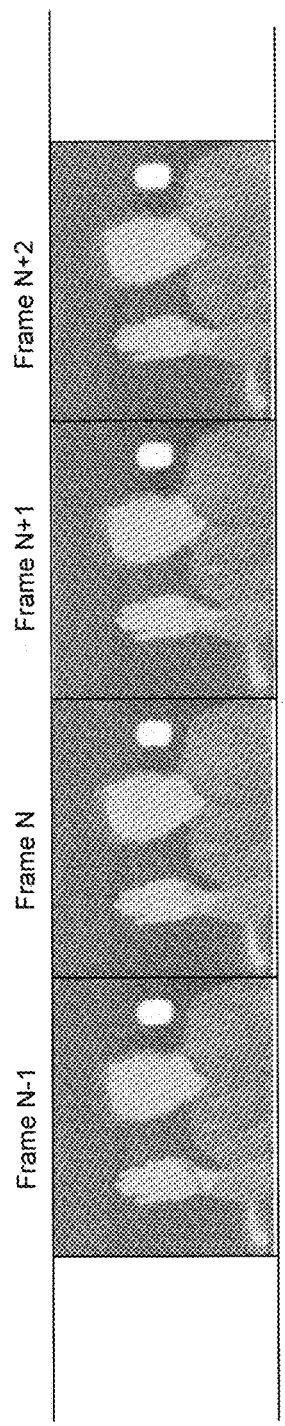
FIG. 5 is an explanatory view of temperature distribution images photographed by an infrared camera according to the embodiments.

FIG. 5 illustrates an example of temperature distribution images of frames (N−1, N, N+1, and N+2) photographed by the infrared camera 1.

The input recognition unit 12 executes the following process: detecting, from among the plurality of temporally successive temperature distribution images captured by the image capture unit 11, pairs of skin temperature image portions each corresponding to temperature of the skin of a person; recognizing, from among the pairs of skin temperature image portions thus detected, pairs of skin temperature image portions as pairs of detection target images, from among which motions are observed; and recognizing an operation input based on states of the motions obtained from among the pairs of detection target images.

Specifically, a function of the input recognition unit 12 is exerted by making the CPU 2 execute a process of recognizing a gesture operation of the user through a binary process and a difference image process, which are described below, on the temperature distribution images of the frames, that is, making the CPU 2 execute, by using the RAM 3, these processes based on the programs stored in the ROM 4.

The apparatus control unit 13 effectively controls necessary for the main function unit 6 in response to the gesture operation recognized by the input recognition unit 12. For example, when recognizing a volume up gesture operation, the apparatus control unit 13 sends a volume up command to the main function unit 6 so that volume up is executed. Specifically, the apparatus control unit 13 exerts a function of an operation of issuing a command to be performed by the CPU 2 in response to a recognized gesture operation.

As shown in FIG. 4, the input apparatus 10 of this example includes at least the infrared camera 1, the image capture unit 11, and the input recognition unit 12. The input recognition unit 12 may double as the apparatus control unit 13.

Figure 6A:
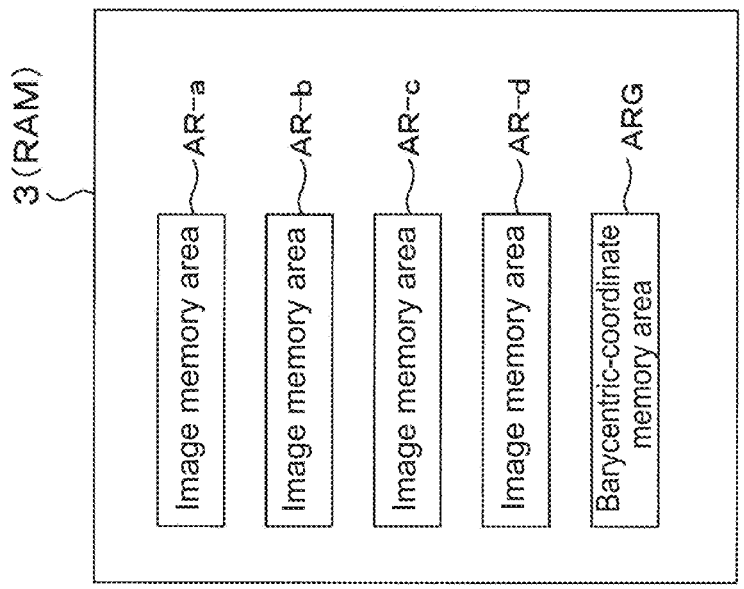
FIG. 6 are explanatory diagrams illustrating an image memory area and a barycentric-coordinate memory area according to the embodiments.

Note that, although description of a specific processing example is not made here, during the process of the input recognition unit 12, the RAM 3 stores various data items. Thus, as a component of the input recognition unit 12, memory areas as shown in FIG. 6A are prepared in the RAM 3.

Specifically, there are prepared image memory areas AR-a, AR-b, AR-c, and AR-d, and a barycentric-coordinate memory area ARG.

Although detailed description is not made here, the image memory areas AR-a and AR-b store binary images of the temperature distribution images photographed by the infrared camera 1.

The image memory area AR-c stores a difference image obtained as a difference between the two binary images stored in the image memory areas AR-a and AR-b.

The image memory area AR-d stores another difference image obtained through erasure of micro regions from the difference image.

The barycentric-coordinate memory area ARG stores barycentric positions of the image stored in the image memory area AR-d.

Figure 6B:
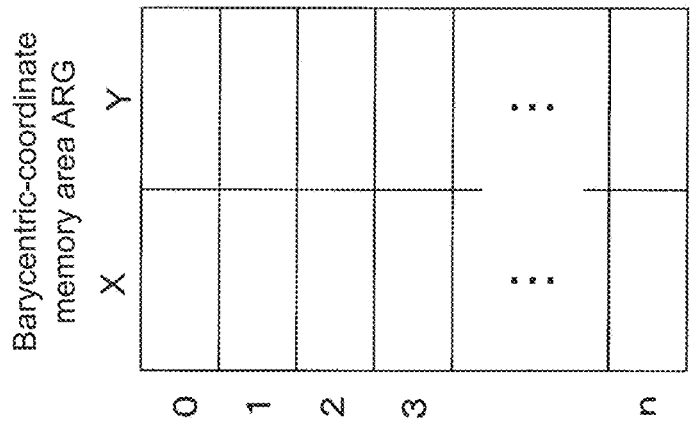

As shown in FIG. 6B, the barycentric-coordinate memory area ARG stores coordinate pairs (X value and Y value) of the barycentric position of the image stored in the image memory area AR-d at each time point. The barycentric-coordinate memory area ARG is capable of storing "n" temporally successive barycentric coordinate pairs of each of the detection target images. The barycentric-coordinate memory area ARG may be used in a form of a ring memory so that the "n" barycentric coordinate pairs thus stored are deleted in an overwriting manner from older ones.

Note that, FIG. 6B shows a storage region for barycentric coordinate pairs of one detection target image. In some cases, barycentric coordinate pairs of each of a plurality of detection target images are stored. In such cases, a plurality of storage regions, which are the same as that in FIG. 6B, are prepared.

3. First Embodiment

3-1: Input Recognition Method

Description is made of how an input recognition process according to a first embodiment is executed in the input apparatus 10 of this example, which is configured as described above.

First, brief description is made of the background of the development of the input recognition process according to the first embodiment.

When temperature distribution images are obtained by using the infrared camera 1, a skin (hand) part of a user can be detected based on temperature distribution thereof. This is advantageous in that gestures are detected by distinguishing the user's hand without executing complicated processes such as image analysis.

However, in terms of accuracy of such detection, there has been a problem as described below.

The images photographed by the infrared camera 1 are obtained in series as shown in FIG. 5 mentioned above. In order to detect the skin part of a person from among such temperature distribution images, parts having temperatures higher than ambient temperature are detected with respect to a predetermined threshold. For example, the images are binarized with respect to a threshold of 30° C.

Figure 7A:
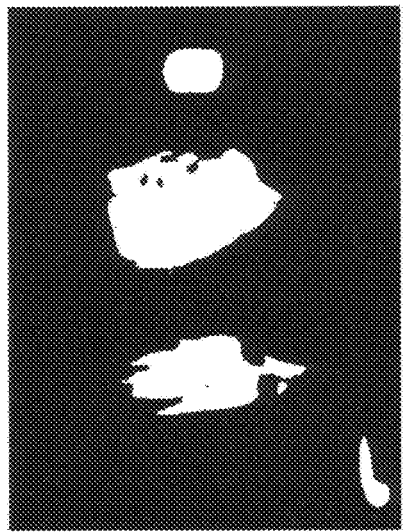
FIG. 7 are explanatory views of one of the temperature distribution images photographed by the infrared camera and a binary image thereof.
Figure 7B:
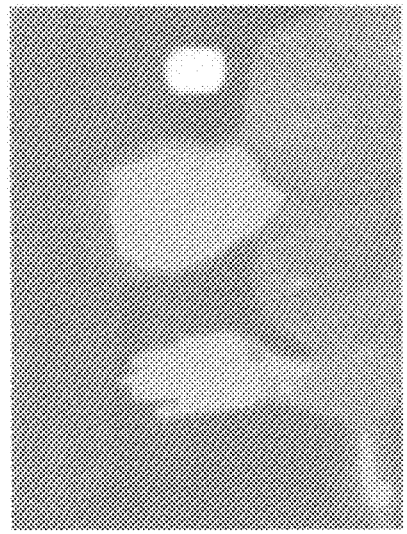

FIG. 7A shows a photographed image (temperature distribution image) of a certain frame, which is photographed by the infrared camera 1, and FIG. 7B shows an image binarized, for example, with respect to the threshold of 30° C.

Although the hand part is detected though binarization, as is understood from FIG. 7B, parts other than the hand part, such as a face part of the user, are detected together. Further, objects having temperature higher than a body temperature, such as an illumination appliance, are detected together as well. Consequently, the hand, the face, and other high-temperature objects are simultaneously detected.

With only such simple binarization, it may be difficult to accurately detect an original target part alone (for example, hand part). As a countermeasure, in this embodiment, while using the temperature distribution images obtained by the infrared camera 1, detection of the hand part alone and input recognition based thereon are performed as described below.

Description is made of such detection and input recognition with reference to FIGS. 8, 9, 10, and 11.

FIG. 8 shows the temperature distribution image of the frame N, which is photographed by the infrared camera 1, and a binary image Pic-a thereof, and a temperature distribution image of the temporally successive subsequent frame N+1, and a binary image Pic-b thereof.

In this example, the temperature distribution images are binarized with respect to two thresholds. Specifically, a first threshold somewhat lower than a body temperature and a second threshold somewhat higher than the body temperature are set so that, first, only objects having temperatures near the body temperature are detected while excluding objects having temperature lower than the body temperature and objects having temperatures higher than the body temperature.

FIG. 10B shows temperature values of pixels on a certain horizontal line on displayed images of the frame N and the frame N+1. The pixels on the certain horizontal line correspond to pixels on a horizontal line indicated by a dashed line in the image of FIG. 10A. The temperature values of the pixels on the horizontal line can be roughly figured out with reference to a solid line in FIG. 10B. In other words, temperatures are high at parts corresponding to the hand, the face, and back illumination.

The abscissa axis in FIG. 10B represents a pixel number in a case where a pixel number on a horizontal line in one frame is six hundred and forty pixels, and the ordinate axis thereof represents a temperature.

The temperature values of the frame N, that is, the temperature values of the pixels on the certain horizontal line are indicated by a solid line, and the temperature values of the frame N+1 are indicated by a broken line.

High-temperature regions in FIG. 10B correspond to the hand part (region HD), the face part (region FC), and a part corresponding to a high-temperature object such as the illumination (region HT).

The frames N and N+1 correspond to photographed images of a user moving his/her hand, and hence pixels of high-temperature parts in the region HD corresponding to the image of the hand are shifted from each other between the frames N and N+1. Meanwhile, the face, the illumination, and the like scarcely move, and hence pixels of high-temperature parts in the region FC and the region HT substantially correspond to each other between the frames N and N+1.

In this context, as described above, the temperature distribution images are binarized with respect to the two thresholds, that is, thresholds th1 and th2.

The first threshold th1 is set to be somewhat lower than a body temperature, for example, set approximately to 32° C., and the second threshold th2 is set to be somewhat higher than the body temperature, for example, set approximately to 38° C.

FIG. 10C shows a state in which the frames N and N+1 have been binarized. Specifically, as a result of the binarization, pixels within a temperature range of from the threshold th1 to the threshold th2 are indicated by "1" and pixels having temperature lower than the threshold th1 and higher than the threshold th2 are indicated by "0".

The binarization with respect to the thresholds th1 and th2 is performed for the purpose of extracting parts corresponding to temperature of the skin of a person while excluding parts having temperature lower or higher than the temperature of the skin of the person.

With this, as shown in FIG. 10C, regions of "1," which correspond to the hand part and the face part, are observed in each of the frames N and N+1. In other words, the skin temperature image portions are extracted through binarization.

Note that, in the example illustrated in FIG. 10C, the regions of "1" slightly exist also in the region HT corresponding, for example, to the illumination part. These regions correspond to pixel parts corresponding to edge parts of a change in temperature.

The binary images Pic-a and Pic-b in FIG. 8 are images obtained as a result of the binarization as described above, in other words, images obtained by extraction of the skin temperature image portions (parts corresponding to "1" are shown in white, and parts corresponding to "0" are shown in black).

Note that, pixels of "1" slightly exist also in edge parts, for example, of the illumination part except the skin part.

In the description hereinabove, binarization is performed mainly for extracting the skin temperature image portions. Next, description is made of generation of a difference image of the detection target images in the skin temperature image portions, from among which a motion is observed, in other words, determination of the difference between two successive binary images.

FIGS. 11A and 11B respectively show certain horizontal lines of the binary images of the frames N and N+1, which are indicated in FIG. 10C, and exclusive ORs are obtained from pixels of each of the binary images. FIG. 11C shows results of the exclusive ORs, from which a difference image Pic-c is obtained.

In the difference image Pic-c, the regions of "1" exist to some extent correspondingly to the hand part showing a motion in each of the frames N and N+1 as original photographed images. Note that, the face part also reflects a slight motion, and hence the regions of "1" are slightly generated also in the face part.

Figure 9A:
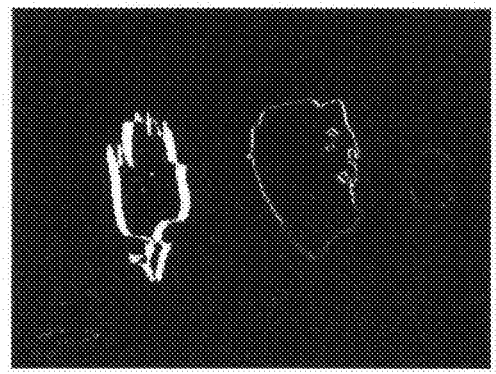
FIG. 9 are explanatory views of difference images and barycenter calculation according to the embodiments.

FIG. 9A shows an example of the difference image Pic-c. As shown in FIG. 9A, a relatively apparent motion of the hand part and the slight motion of the face part appear in the difference image Pic-c.

Note that, other objects such as illumination are motionless, and hence disappear at a time point of the difference image Pic-c.

Subsequently, the detection target images are judged by using the difference image Pic-c so that a motion state is detected from among the detection target images.

In the description hereinbelow, an image obtained by erasing image parts at which motions have been judged to be slight from the skin temperature image portions in the difference image Pic-c of FIGS. 9A and 11C refers to a detection target image.

Figure 9B:

For example, when regions minute in pixel number (that is, minute in area in the displayed image) are erased from the difference image Pic-c, as shown in FIGS. 9B and 11D, a difference image Pic-d from which micro regions have been erased is obtained.

The image parts that have appeared in the difference image Pic-d from which micro regions have been erased constitute the detection target image, that is, the parts corresponding to the user's hand moved for performing a gesture operation.

Note that, motions of other remaining parts corresponding to the objects having temperatures higher than a body temperature are not observed between the frames, and hence the other remaining parts disappear at a phase of the difference image Pic-c as described above. However, for example, in a case where a slight motion such as that of flame of a candle has been detected, the slight motion appears as a micro region in the difference image Pic-c. However, in the difference image Pic-d from which the micro regions have been additionally erased, even such a part is erased. As a result, the part corresponding to the apparent hand motion as a gesture operation is much more likely to be left.

After the detection target image has been extracted as the difference image Pic-d, a barycentric coordinate pair of the detection target image (hand) is typically determined as a feature point thereof.

Figure 9C:
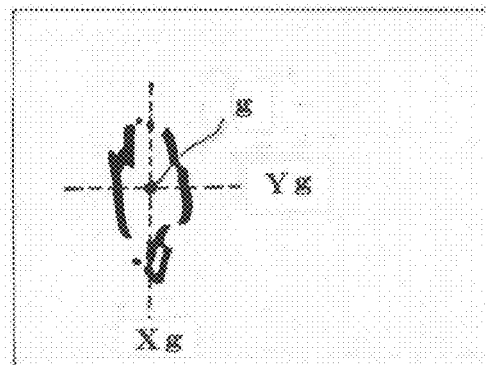

As shown in FIG. 9C, a barycenter g of the detection target image as an image showing a motion is determined, and an X coordinate value (Xg) and a Y coordinate value (Yg) on the image are calculated.

The barycentric coordinate pair is used as one position coordinate pair of the hand to perform a gesture operation, and is stored in the above-mentioned barycentric-coordinate memory area ARG in FIG. 6B.

Subsequently, the motion of the hand is judged based on variation among barycentric coordinate pairs to be similarly calculated thereafter, in other words, based on motion vectors calculated based on barycentric coordinate pairs to be sequentially stored in the barycentric-coordinate memory area ARG.

That is, after one barycentric coordinate pair has been calculated from the difference image obtained through binarization of the frames N and N+1 as described above, barycentric coordinate pairs of another difference image similarly generated based, for example, on the frames N+1 and N+2 are calculated, and then stored in the barycentric-coordinate memory area ARG.

Further, similarly, barycentric coordinate pairs are calculated from difference images obtained based on frames N+2 and N+3, frames N+3 and N+4, and subsequent frame pairs, and stored in the barycentric-coordinate memory area ARG.

During such an operation, the CPU 2 (input recognition unit 12) can judge the motion of the hand based on variation of the coordinate values stored in the barycentric-coordinate memory area ARG.

Note that, in the description herein, as in a typical example, the barycentric coordinate pair is used as the feature point of the detection target image (hand). However, the feature point is not limited thereto, and may include a coordinate pair of an uppermost portion corresponding to a fingertip, and a coordinate pair of an intermediate portion between the barycenter and the uppermost portion. The feature point may be appropriately selected because some large hand motions, which are assigned to some of the gesture operations, can be more easily made with a fingertip than with the wrist.

3-2: Input Recognition Process

With reference to FIG. 12, description is made of a specific processing example of the CPU 2 to execute the input recognition process described hereinabove. The process shown in FIG. 12 corresponds to the following executed in the configuration of FIG. 4: the input recognition unit 12 recognizes a gesture operation by executing the processing contents of Steps F101 to F109 on the temperature distribution images sequentially captured from the infrared camera 1 by the image capture unit 11; and in response thereto, in Step F110, the apparatus control unit 13 effectively controls in accordance with the gesture operation. In the following, these steps are described as the process of the CPU 2.

First, in Step F101, as an initial processing content, the CPU 2 clears the image memory areas AR-a and AR-b described with reference to FIG. 6.

Also after that, until input recognition of the gesture operation is completed, the CPU 2 repeats the processing contents of Steps F102 to F110 every time the photographed images from the infrared camera 1 are captured.

The image memory areas AR-a and AR-b secured in the RAM 3 are used as areas for storing the binary images Pic-a and Pic-b as shown in FIG. 8. The photographed images of the frames from the infrared camera 1 (temperature distribution images) are sequentially binarized, and then stored in the image memory areas AR-a and AR-b for generation of the difference image Pic-c.

Thus, in Step F102, the CPU 2 moves an image data item in the image memory area AR-b to the image memory area AR-a.

Further, in Step F103, the CPU 2 binarizes the photographed images of the currently captured frames (temperature distribution images) with respect to the thresholds th1 and th2, and stores the binarized images in the image memory area AR-b.

In Step F104, the CPU 2 confirms whether or not a binary image is stored in the image memory area AR-a, and returns to Step F102 when the binary image is not stored.

By the process described above, the respective binary images of the current frame (frame N+1) and the previous frame (frame N), which are sequentially photographed, are stored respectively in the image memory area AR-b and the image memory area AR-a.

In other words, a photographed image of a first frame after the start of the process is first converted into a binary image in Step F103, and then stored in the image memory area AR-b.

At the time point when the subsequent frame is captured, in Step F102, the binary image of the previous frame has already been moved to the image memory area AR-a. Thus, the binary image of the current frame is stored in the image memory area AR-b.

Therefore, the binary image Pic-b of the current frame is stored in the image memory area AR-b, and the binary image Pic-a of the previous frame is stored in the image memory area AR-a. Steps F102 and F103 are repeatedly executed to frames to be subsequently captured.

The processes to be performed on the second frame and subsequent frames of the photographed images are performed at the time point of capturing these frames under the state in which the current binary image Pic-b and the previous binary image Pic-a have been stored respectively in the image memory areas AR-b and AR-a. In such a case, the process proceeds from Step F104 to Step F105.

In Step F105, the CPU 2 generates the difference image Pic-c by calculating exclusive ORs of the pixel values of each of the binary images Pic-a and Pic-b stored respectively in the image memory areas AR-a and AR-b. The difference image Pic-c is stored in the image memory area AR-c.

Next, in Step F106, the CPU 2 erases the micro regions from the difference image Pic-c so as to generate the difference image Pic-d as shown in FIG. 9B for example, from which the micro regions have been erased. Then, the CPU 2 stores the difference image Pic-d in the image memory area AR-d.

Specifically, it suffices that, in the difference image Pic-c, when the pixel values of each area of regions each formed of the successively existing pixels of "1" are equal to or smaller than a predetermined value (predetermined pixel number), such pixel values are replaced with "0."

In this way, the difference image Pic-d as a difference image in which the detection target image corresponding to a detection target such as the hand of the user is left is obtained.

Then, in Step F107, the CPU 2 executes barycenter calculation on the detection target image that appears in the difference image Pic-d, and stores barycentric coordinate values thus calculated in the barycentric-coordinate memory area ARG.

In Step F108, the CPU 2 analyzes the coordinate values stored at that time point in the barycentric-coordinate memory area ARG so as to judge a motion state of the detection target image.

Specifically, when a plurality of barycentric coordinate pairs exist in the barycentric-coordinate memory area ARG, a variation vector (direction and variation amount) of each of the barycentric coordinate pairs is calculated.

Based on the one or a plurality of vectors thus calculated, it is judged how the detection target image has moved (variation in position on the image).

Note that, in such a process, the motion state is judged only after values of at least two coordinate pairs have been stored in the barycentric-coordinate memory area ARG. In other words, the motion state can be judged only after the processing contents of Steps F102 to F107 have been executed at least after a photographed image of a third frame has been captured. In still other words, after the second frame has been captured, a first barycentric coordinate pair can be judged based on the difference image of the first and second frames, and a second barycentric coordinate pair can be judged based on the difference image of the second and third frames.

In Step F109, the CPU 2 judges whether or not a certain gesture operation has been performed based on the result of the analysis on the motion state in Step F108. In a case where it has been judged that the process is at a time point when the second frame has not yet been captured, in other words, a time point at which it is difficult to analyze the motion state, or that a detected motion state does not correspond to a particular gesture operation, the process returns to Step F102 and repeats Steps described above with respect to subsequent captured images.

Meanwhile, in a case where, at a certain time point, the motion state of the detection target image, which has been judged in Step F108, has been judged to correspond to a motion of a certain gesture operation, the process of the CPU 2 proceeds to Step F110 so that a control command assigned to the certain gesture operation is sent to the main function unit 6.

For example, when a motion state in which the hand of the user is moved to the left as illustrated in FIG. 2A is recognized, the CPU 2 send a control command of the channel UP operation to the main function unit 6 so that the channel UP operation is performed.

By the process described above, the CPU 2 judges the motion state of the hand (detection target) of the user in the image (detection target image) among the photographed images from the infrared camera 1, and effectively controls such that, in a case where the motion state corresponds to a motion of a preset gesture operation, the apparatus is operated in accordance with the corresponding gesture operation.

Such an input recognition process according to the first embodiment is advantageous in the following points.

First, the images from the infrared camera 1 are binarized with respect to the thresholds th1 and th2 which are set to define the temperature range of the skin of a person, and hence objects having temperatures inequivalent to the temperature of the skin of the person can be excluded from the detection target. For example, such objects include high temperature objects such as an illumination appliance and a heating appliance, and furniture items having temperatures normally lower than the body temperature. Thus, through binarization of the infrared-photography temperature distribution images, the parts corresponding to the skin of the person, that is, the skin temperature image portions can be easily extracted.

In addition to this, the skin temperature image portions showing a motion are extracted as a difference image. With this, when the hand is set as a detection target, parts which do not correspond to detection targets but correspond to skin temperature image portions, such as a face, can be excluded.

In other words, through binarization and generation of the difference image, the detection target image can be extracted without executing a complicated process such as shape analysis using pattern matching of images.

In such a process, in some cases, images other than the detection target images are left as the micro regions in the difference image. However, by erasing such micro regions, for example, erasing parts in which regions each formed of the successively existing pixels (pixel number) occupy an area equal to or smaller than a predetermined area (difference image Pic-d), the detection target images showing a motion can be more accurately judged.

Note that, erasure of the micro regions is also advantageous in that motions of persons irrelevant to a gesture operation, such as a motion of the hand of a person at a position distant, for example, from the television receiver 20, are not misrecognized as gesture operations. In other words, images of parts corresponding to the skin of the distant persons occupy a small area, and hence are consequently erased from the difference image Pic-d even having appeared in the difference image Pic-c.

After the detection target image has been extracted from the difference image Pic-d as described above, the barycentric coordinate pair of the detection target image is calculated. Then, based on variation of the barycentric coordinate pair, the motion state is judged in terms of variation in position of the detection target image, in other words, an amount of the motion and directionality. This can also be performed by a simple vector calculation between barycentric positions.

By such a process of this example, with simple arithmetic processes, gesture operations can be accurately recognized, and control can be effected in accordance with the gesture operations. With this, a human interface to be accurately controlled by gesture operations can be easily provided.

Note that, by using the infrared camera 1, the parts corresponding to the skin, which are used for judging gesture operations of an operator, can be detected even in a darkened place where illumination is turned off. Thus, there is another advantage that input recognition can be appropriately performed even in a darkened room.

3-3: Position of Infrared Camera

Regarding arrangement of the infrared camera 1 with respect to the television receiver 20, as illustrated in FIG. 1, the infrared camera 1 is desirable to be arranged on an upper side of an apparatus as much as possible.

Figure 13A:
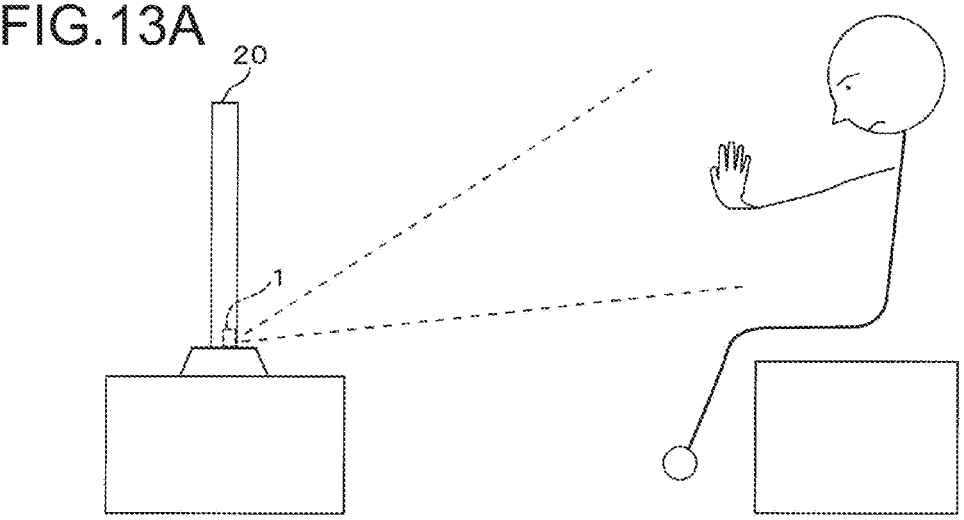
FIG. 13 are explanatory diagrams illustrating a case where an infrared camera is positioned on a lower side of an apparatus.

FIG. 13A illustrates a state in which the infrared camera 1 is arranged at a lower position of the chassis of the television receiver 20.

In this case, as illustrated in FIG. 13A, a photographing view angle of the infrared camera 1 is set within a certain elevation angle range so that a space in front of the chest of a user can be appropriately photographed. This is because, it is conceived that the user performs hand gesture operations normally at a position in the space in front of his/her chest.

Figure 13B:
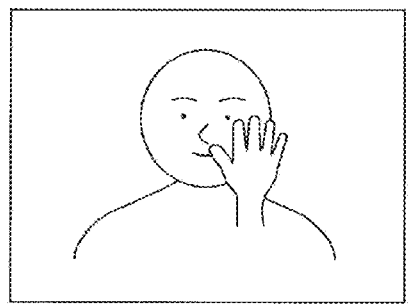

However, in this case, as illustrated in FIG. 13B, in many of photographed images, the hand part probably overlaps the face part therebehind.

In such a photographed image, after binarization, the hand part and the face part exist in the same region, and hence a motion of the hand is less likely to appear in the difference image Pic-c.

Figure 14A:
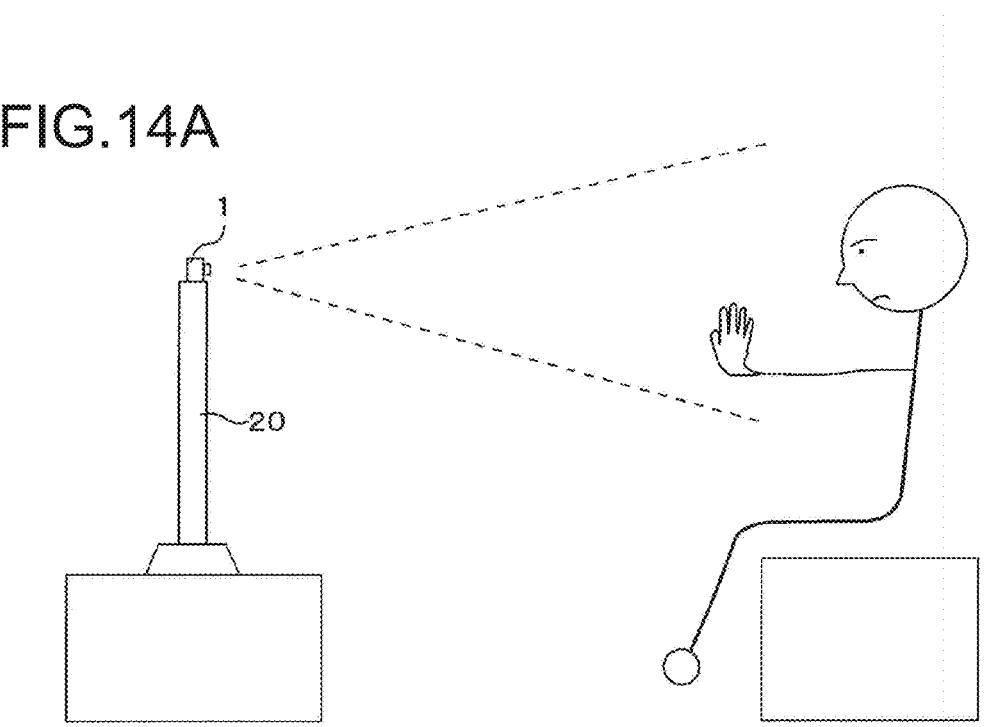
FIG. 14 are explanatory diagrams illustrating a case where the infrared camera is positioned on an upper side of the apparatus.
Figure 14B:
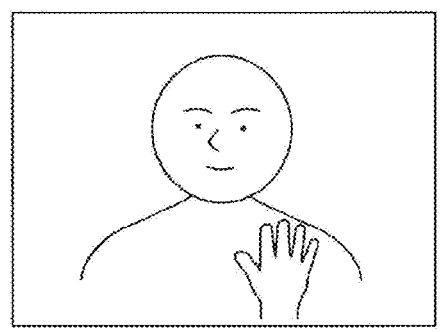

Meanwhile, as illustrated in FIG. 14A, when the infrared camera 1 is arranged as high as possible, in the photographed image, as illustrated in FIG. 14B, the face part and the hand part are more likely to be clearly separated from each other.

In other words, in this case, in the difference image Pic-c, the motion of the hand is scarcely hidden by the face, and hence the motion of the hand can be clearly judged.

As is understood from the above description, in consideration of the fact that the hand of a user normally comes to a position lower than a position of his/her face, in an input apparatus configured to detect hand gesture operations, it is desirable that the infrared camera 1 photographs images from a position as high as possible (position from which images in which the hand and the face are unlikely to overlap each other are photographed).

Specifically, it is suitable that the infrared camera 1 is incorporated in an upper part of an apparatus chassis, or positioned on an upper side while being separated from the apparatus chassis.

4. Second Embodiment

Next, description is made of a processing example of input recognition according to a second embodiment with reference to FIG. 15. FIG. 15 shows a process of the CPU 2 similar to FIG. 12 above. Note that, in FIG. 15, Steps the same as those in FIG. 12 are denoted by the same step numbers to omit description thereof.

In this processing example, the CPU 2 (input recognition unit 12) selects detection target images from among skin temperature image portions that occupy an area equal to or larger than a predetermined area in binary images of temperature distribution images photographed by the infrared camera 1.

In the processing example of FIG. 15, Step F140 is added subsequently to Steps F101 to F104 which are the same as those in FIG. 12.

In Step F140, the CPU 2 confirms whether the pixel regions in each of which the pixels of "1" occupy an area equal to or larger than a predetermined area have existed in the binary images Pic-a and Pic-b stored respectively in the image memory areas AR-a and AR-b. As described above in the first embodiment, the pixels of "1" constitute the skin temperature image portions corresponding to the hand and the face each having temperature between the thresholds th1 and th2.

The CPU 2 confirms the pixel regions in which the pixels of "1" successively exist, and calculates areas (that is, pixel numbers) thereof. Then, in a case where the skin temperature image portions that occupy an area (pixel number) equal to or larger than a predetermined area have existed in each of the binary images Pic-a and Pic-b, the process proceeds to Step F105 and subsequent Steps. The processing contents of Steps F105 to F110 are the same as those in FIG. 12.

Further, in a case where the skin temperature image portions that occupy the area equal to or larger than a predetermined area have been judged not to exist in at least one of the binary images Pic-a and Pic-b by the process of Step F140, the CPU 2 returns the process to Step F102. In other words, in that case, the difference image Pic-c is not generated, or coordinate calculation is not executed.

The process of this processing example is advantageous in the following points: the process is more efficiently executed by emitting execution of unnecessary arithmetic processes; motions other than that of the hand of a user as an operator are less liable to be misrecognized as gesture operations.

In other words, the process of this processing example is designed with focus on the fact that, when the skin temperature image portions that occupy the area equal to or larger than a predetermined area are judged not to exist in at least one of the binary images Pic-a and Pic-b in Step F140, gesture operations probably have not been performed by the user as an operator.

Normally, as illustrated in FIG. 1, in front of the television receiver 20, the user who performs gesture operations is located relatively near the television receiver 20. Thus, the face and the hand of the operator occupy a relatively large area (pixel regions) in the photographed images from the infrared camera 1.

Meanwhile, when the operator moves away from front of the television receiver 20, the face or the hand of the operator is not photographed in the temperature distribution images. Further, in a case where another person is located at a distant position at which, normally, gesture operations are not performed, even when the face and the hand of the person are photographed by the infrared camera 1, an area to be occupied by skin temperature image portions corresponding thereto is small. Thus, such a configuration is employed that, even when the skin temperature image portions appear in binary images, it is determined that the images of the skin temperature image portions that occupy a small area do not correspond to the "hand part of the user, with which a gesture operation may have been made," and the process is cancelled at Step F140 (Step F105 and subsequent Steps are not executed.

With this, motions of the distance person are prevented from being misrecognized as gesture operations, and the process can be more efficiently executed by stopping generation of unnecessary difference images and coordinate calculation when there is no person.

Figure 16:
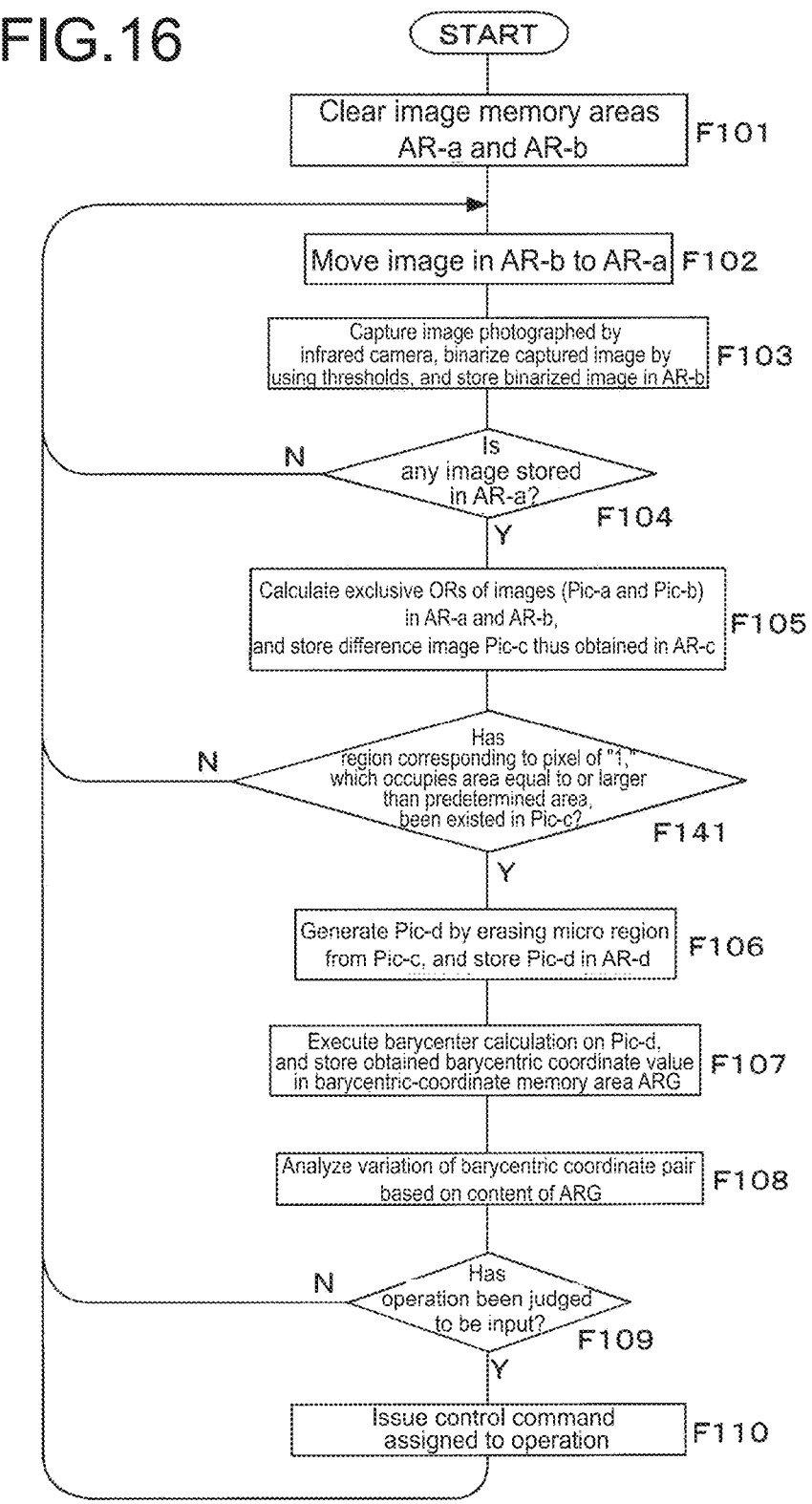
FIG. 16 is a flowchart showing an input recognition process according to a modification of the second embodiment.

As a process for the same purpose, there may be executed a process as shown in FIG. 16. The process of FIG. 16 is obtained by adding Step F141 to the process of FIG. 12.

Steps F101 to F105 are the same as those in FIG. 12.

In Step F141, the CPU 2 confirms whether or not, at a time point when the difference image Pic-c is generated in Step F105, the regions in each of which the successive pixels of "1" occupy the area equal to or larger than a predetermined area have existed in the difference image Pic-c.

Then, in a case where parts corresponding to the pixels of "1," which occupy the area equal to or larger than a predetermined area (pixel number), have existed in the difference image Pic-c, the process proceeds to Step F106 and subsequent Steps. The processing contents of Steps F106 to F110 are the same as those in FIG. 12.

Further, in a case where the parts corresponding to the pixels of "1," which occupy the area equal to or larger than a predetermined area, have been judged not to exist in the difference image Pic-c by the processing content of Step F141, the CPU 2 returns the process to Step F102. In other words, in that case, coordinate calculation is not executed.

The pixels of "1" in the difference image Pic-c correspond to parts showing a motion in the skin temperature image portions. Thus, in the case where, in Step F141, the successive pixels of "1" have been judged to occupy the area equal to or larger than a predetermined area in difference image Pic-c, it can be judged that the skin temperature image portions corresponding to the hand and the face include regions showing a somewhat apparent motion.

As described in the first embodiment, in Step F106, micro regions are erased from the difference image Pic-c. In this context, in the case where the regions corresponding to the pixels of "1," which occupy the area equal to or larger than a predetermined area, have been judged not to exist, motions effective to be gesture operations are not detected.

For example, under a state in which the thresholds used for the area judgment in Step F141 and the thresholds used for the micro-region judgment in Step F106 are set to be equal to each other, in the case where the regions corresponding to the pixels of "1," which occupy the area equal to or larger than a predetermined area, have been judged not to exist in Step F141, there occurs a situation in which the pixels of "1" do not exist any longer in the difference image Pic-d after the micro regions have been erased in Step F106. In other words, images showing a motion corresponding to a gesture operation have not existed from the first.

Further, for example, under a state in which the thresholds used for the area judgment in Step F141 are set to be larger than the thresholds used for the micro-region judgment in Step F106, the case where the regions corresponding to the pixels of "1," which occupy the area equal to or larger than a predetermined area, have been judged not to exist in Step F141, is a case where the pixels of "1" in the difference image Pic-d represent information corresponding to images showing a not very large motion after the micro regions have been erased in Step F106. In other words, the pixels of "1" in that case are unlikely to represent information corresponding to a gesture operation.

Therefore, in the case where the regions corresponding to the pixels of "1," which occupy the area equal to or larger than a predetermined area, have not existed in the difference image Pic-c, the images corresponding to a gesture operation are quite unlikely to be shown. Thus, in such a case, the process is executed with higher efficiency by being configured to return from Step F141 to Step F102 without executing calculation of the coordinate values, and slight motions are prevented from being misrecognized as a part of a gesture operation.

5. Third Embodiment

Figure 17:
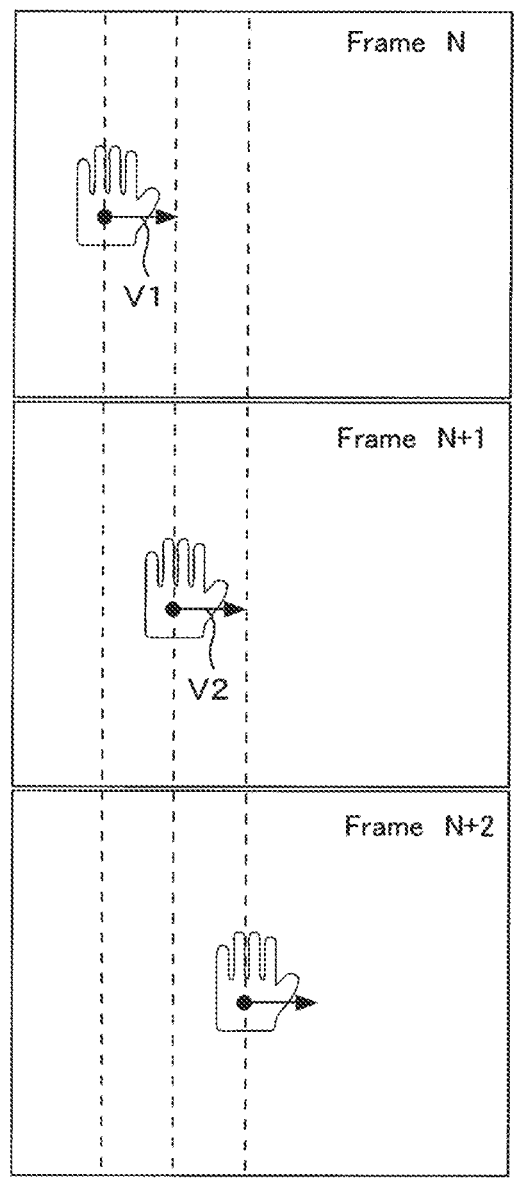
FIG. 17 is an explanatory diagram illustrating motion judgment according to a third embodiment.

Description is made of a process according to a third embodiment with reference to FIG. 17 and FIG. 18. In this example, the CPU 2 (input recognition unit 12) executes a recognition process of an operation input provided that a positional variation by a predetermined amount or larger, which shows the states of the motions of the detection target images, is successively detected predetermined times or more.

FIG. 17 illustrates only a part corresponding to the hand of the user in the binary images of the frames N, N+1, and N+2. When a gesture operation is performed, a motion by a certain amount or more of the hand of the user is successively observed over the frames. For example, as illustrated in FIG. 17, variation of the position of the hand in the binary images is successively observed over the frames N, N+1, N+2, and subsequent frames.

Meanwhile, even in a case of having appeared in the binary image, when the image of the hand is located at substantially the same position in each of the successive frames, it can be determined that the hand has not moved, and hence a gesture operation has not been performed.

Thus, when judgment is made provided that a positional variation by a predetermined amount or larger, which shows the state of the motion of the images of the hand as the detection target image, is successively detected over a predetermined number or more of frames, whether or not the motion corresponds to a gesture operation can be accurately judged.

Specifically, it suffices that, in Step F108 shown in FIG. 12, the CPU 2 executes a subroutine shown in FIG. 18.

As described in the first embodiment, in Step F108 of FIG. 12, the CPU 2 analyzes the coordinate values stored in the barycentric-coordinate memory area ARG so as to judge the motion state. At this time, the CPU 2 executes the motion judgment process of FIG. 18.

Note that, in the processing example of FIG. 18, a motion by a predetermined amount or larger is detected two successive times.

First, in Step F150, the CPU 2 calculates a motion vector of the detection target over the frames N and N+1, and sets this motion vector as a motion vector V1.

Further, in Step F151, the CPU 2 calculates a motion vector of the detection target over the frames N+1 and N+2, and sets this motion vector as a motion vector V2.

FIG. 17 schematically illustrates, with use of the binary images, the motion vector V1 of the detection target over the frames N and N+1, and the motion vector V2 of the detection target over the frames N+1 and N+2. In this context, the processing example of FIG. 17 is somewhat different from the processing example of FIG. 12.

In the processing example of FIG. 12, actually, the coordinate values are calculated based on the difference image Pic-d from which the micro regions have been erased, and hence the motion vector V1 is calculated based on coordinate values obtained from a difference image Pic-d generated from the frames N and N+1, and coordinate values obtained from another difference image Pic-d generated from the frames N+1 and N+2. Similarly, the motion vector V2 is calculated based on coordinate values obtained from the difference image Pic-d generated from the frames N+1 and N+2, and coordinate values obtained from still another difference image Pic-d generated from the frames N+2 and N+3.

In other words, it suffices that the motion vectors V1 and V2 are obtained based on differences of the coordinate values sequentially stored in the barycentric-coordinate memory area ARG.

In Step F152, the CPU 2 judges whether or not each of the motion vectors V1 and V2 is larger than a motion-amount threshold Vs.

In a case where both V1>Vs and V2>Vs have been satisfied, the process proceeds to Step F153, and the CPU 2 judges that a motion has been made. Meanwhile, in a case where none or one of V1>Vs and V2>Vs has been satisfied, the process proceeds to Step F154, and the CPU 2 judges that the motion has not been made.

FIG. 18 shows only a part of the processing content in Step F108 (motion judgment). In the case where the CPU 2 judges that the motion has been made, the CPU 2 judges the state of the motion based on the coordinate values stored in the barycentric-coordinate memory area ARG, and determines whether or not the motion corresponds to a gesture operation.

Meanwhile, in the case where the CPU 2 judges that the motion has not been made, the CPU 2 does not determine whether or not the state of the motion corresponds to the gesture operation. Thus, it can be immediately judged that the operation input has not been performed.

In this way, when the state of the motion is determined provided that a positional variation by a predetermined amount or larger, which shows the states of the motions of the detection target images, is successively detected predetermined times or more, in other words, provided that an amount of the motion calculated based on the motion vectors is kept equal to or larger than a predetermined amount, misoperations caused by unnecessary responses to an instant motion or a slight motion of a user are prevented, and the process can be executed with higher efficiency.

Note that, in the example of FIG. 18, although the motions made two successive times by the amount larger than the motion-amount threshold Vs are set as a condition, as a matter of course, regarding the times, three successive times or four successive times may be set as a condition.

For example, in the case of the three successive times, it suffices that a motion vector V3 of a subsequent frame is calculated, and V1>Vs, V2>Vs, and V3>Vs are simultaneously satisfied.

Further, in the above-mentioned example, although the subroutine of FIG. 18 is executed in Step F108 of FIG. 12, this should not be construed restrictively. For example, as illustrated in FIG. 17, the motion vectors V1, V2, and subsequent motion vectors may be calculated based on the binary images of the frames, and at that phase, it may be judged whether or not the conditions of the predetermined time and the predetermined amount are satisfied.

6. Fourth Embodiment

Figure 19A:
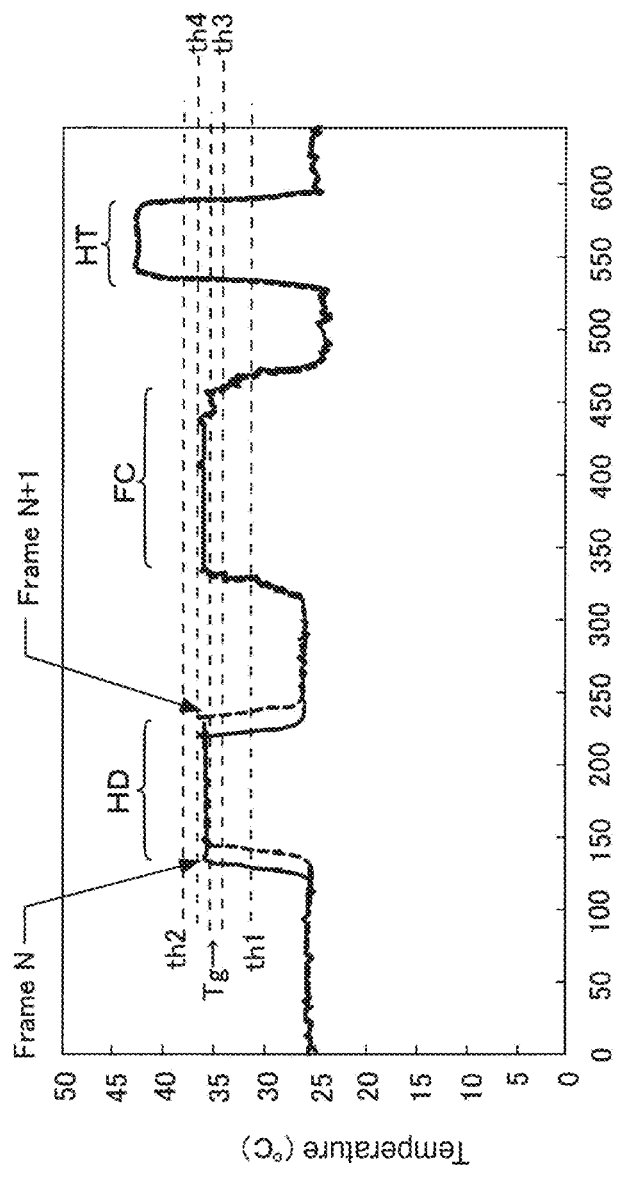
FIGS. 19A and 19B are explanatory diagrams illustrating extraction of skin temperature image portions according to a fourth embodiment.
Figure 19B:
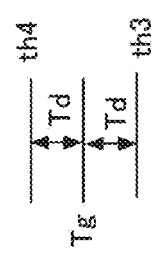
Figure 20:
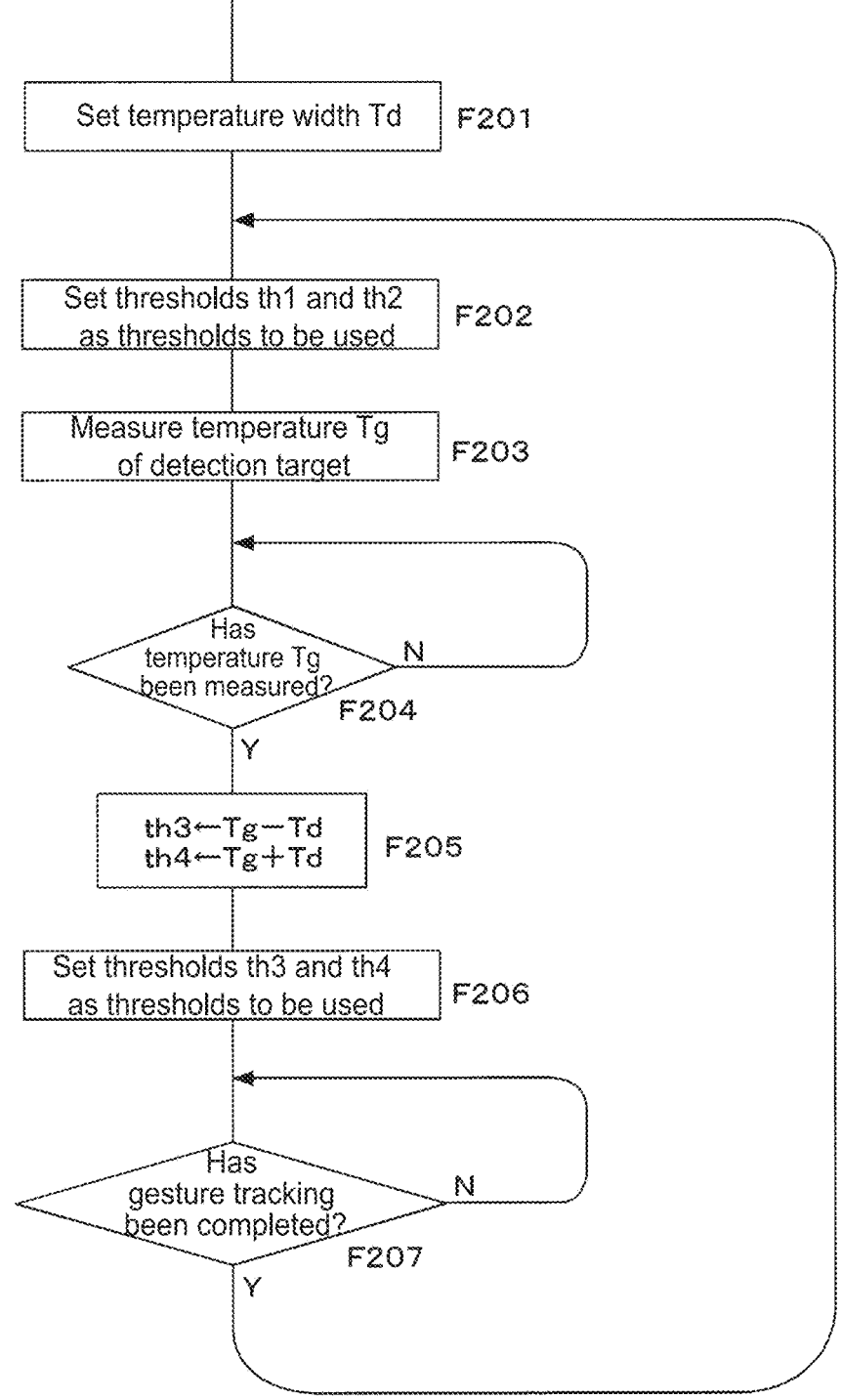
FIG. 20 is a flowchart of a threshold adjustment process according to the fourth embodiment.

Description is made of a processing example according to a fourth embodiment with reference to FIGS. 19 and 20.

In this processing example, at the time of generation of a binary image, in a case where a temperature of the detection target has been specified after a part corresponding, for example, to the hand as a target has been detected by using the first threshold th1 and the second threshold th2, a third threshold th3 larger than the first threshold th1 and a fourth threshold th4 smaller than the second threshold th2 are set such that a detection range is narrowed. In this way, skin temperature image portions are more easily specified.

As shown in FIG. 19A and as described above in the first embodiment, the CPU 2 (input recognition unit 12) detects the skin temperature image portions from among the temperature distribution images by comparing the temperature values of the pixels of each of the temperature distribution images with each other with respect to the thresholds th1 and th2 which are set to define the temperature range of the skin of a person.

After that, based on the temperature values of the skin temperature image portions recognized as the detection target images, the CPU 2 sets the thresholds th3 and th4 (refer to FIG. 19A) defining a temperature range smaller than the temperature range defined by the thresholds th1 and th2. Subsequently, by using the thresholds th3 and th4, the CPU 2 detects the skin temperature image portions from among the temperature distribution images, in other words, generates binary images. Temperature detection using infrared rays is excellent in resolution, and hence even a difference smaller than 0.1° C. can be detected. Thus, a temperature differences between the face and the hand of a user, differences among individual body temperatures, and the like can be sufficiently detected. With this, gesture operations can be recognized with higher accuracy.

In order to execute such a process, it suffices that the CPU 2 executes an input recognition process similar, for example, to that in FIG. 12. Specifically, the CPU 2 (input recognition unit 12) executes, for example, a threshold adjustment process as shown in FIG. 20 along with the process of FIG. 12.

In Step F201, the CPU 2 sets temperature widths Td as initial setting. The temperature widths Td refer to temperature widths shown in FIG. 19B from a target temperature Tg to the thresholds th3 and th4. The target temperature Tg is a temperature, for example, of a hand as a detection target.

In Step F202, the CPU 2 sets the thresholds th1 and th2, which defines a general temperature range in which the skin of a person is detected, as the thresholds to be used in Step F103 of FIG. 12.

With this, the process of FIG. 12 is prepared to be executed as described in the first embodiment.

After that, in Step F203, the CPU 2 measures a temperature of a detection target (target temperature Tg). This processing content can be executed after a detection target image has been specified at a certain time point during the execution of the process of FIG. 12. The certain time point at which the detection target image is specified is, for example, the time point of Step F106 of FIG. 12, at which the difference image Pic-d from which micro regions has been erased is obtained.

When positions of the pixels (coordinate values) of the binary image corresponding to the detection target image specified in the difference image are calculated and temperature values at the positions of the pixels are detected in the original temperature distribution image of the binary image, the temperature values can be obtained as a temperature of a detection target (for example, hand of a user as an operator), in other words, as the target temperature Tg.

The CPU 2 advances the process from Step F204 to Step F205 after the target temperature Tg has been measured, and determines the thresholds th3 and th4 as follows based on the temperature widths Td set in advance and the target temperature Tg.

Threshold th3=Tg−Td
Threshold th4=Tg+Td

After the thresholds th3 and th4 have been determined in this way, in Step F206, the CPU 2 sets the thresholds th3 and th4 as the thresholds to be used Step F103 of FIG. 12.

With this, in subsequent parts of the process of FIG. 12 to be continued also after the threshold adjustment process, the binary process in Step F103 is executed by using the thresholds th3 and th4.

In the binary images generated by using the thresholds th3 and th4, parts other than the part corresponding to the skin of an operator are excluded with higher accuracy. Thus, the skin temperature image portions to appear in the binary images are more likely to include the parts corresponding to the skin of the operator.

As a result, a gesture operation can be recognized with higher accuracy by the process, for example, of FIG. 12. This is because the skin temperature image portions in the binary images can be judged with higher accuracy.

Further, in a case where a plurality of persons exist, images of parts corresponding to the skin of persons other than the operator can be more likely to be excluded from the binary images. Also with this advantage, gesture operations can be recognized with higher accuracy.

Still further, in a case where a temperature of the hand and a temperature of the face of the operator are somewhat deviated from each other, the hand part can be extracted alone as a binary image. Also in this case, gesture operations can be recognized with higher accuracy. Specifically, there is an advantage that, even when a part of a range in which the operator moves his/her hand overlaps the face, only a motion of the hand can be accurately recognized.

The state of using the thresholds th3 and th4 is maintained until gesture tracking is completed. After the gesture tracking has been completed, the process returns to Step F202, and the state of using the thresholds th3 and th4 is reset to the state of using the thresholds th1 and th2.

There are conceived various examples of how the completion of the gesture tracking is judged in Step F207.

For example, in a case where single gesture operation has been recognized through the process of FIG. 12, the gesture tracking may be completed at the time point when the control command is issued in Step F110. In such a case, in the processes to be executed on the frames regarding the single gesture operation, the binary images can be obtained with higher accuracy after the thresholds th3 and th4 have been set, and hence the state of the motion as the gesture operation can be recognized with higher accuracy.

Alternatively, in a case where the thresholds th3 and th4 have been set with respect to a skin temperature of a certain user, which has been set as the target temperature Tg, gesture operations of other users may not be recognized. Thus, in order to treat the gesture operations of the plurality of persons, it is suitable to cancel the setting of the thresholds th3 and th4 after the single gesture operation has been completed so that the use state of the thresholds th3 and th4 is returned to the use state of thresholds th1 and th2.

Still alternatively, in a case where no gesture operation has been recognized in a certain time interval, it may be judged that the gesture tracking has been completed.

Yet alternatively, it is naturally conceived that a certain user successively performs gesture operations. In this case, when the use state of the thresholds th3 and th4 is set once with respect to a skin temperature of the certain user, which has been set as the target temperature Tg, it is desirable that the thresholds th3 and th4 be subsequently used. Thus, in a case where any gesture has been ade repeatedly at short time intervals, it is suitable to maintain the use state of the thresholds th3 and th4 on the assumption that the operation is performed by the same person.

Yet alternatively, when the use state of the thresholds th3 and th4 are maintained over a certain time period, the measurement of the target temperature Tg in Step F203 may be performed after at least one gesture operation has been detected. This is because, in a case where an operation has been recognized as the at least one gesture operation, when images corresponding to the operation are recognized as a detection target image, a temperature of the detection target can be accurately detected. As a result, accuracy of the thresholds th3 and th4 can be enhanced.

Yet alternatively, it may be judged that the gesture tracking has been completed after the elapse of a certain time period after setting of the thresholds th3 and th4 for the same purpose.

Yet alternatively, a particular gesture operation may be set as an operation of cancelling the setting of the thresholds th3 and th4 so that the gesture tracking is completed with an instruction from the user.

Note that, although the subroutine of FIG. 20 described above is executed along with the input recognition process of FIG. 12, in this context, it is conceived that the thresholds th3 and th4 are set, for example, with a setting mode.

For example, as the setting mode, a user had to put his/her hand in front of the infrared camera 1, or had to perform a gesture operation in the use state of the thresholds th1 and th2. In this state, the skin temperature image portions are detected, and a temperature of pixels of the corresponding parts in the temperature distribution image is set to be the target temperature Tg. After the target temperature Tg has been obtained, the thresholds th3 and th4 are set, and subsequently, the thresholds th3 and th4 continues to be used as the thresholds to be used in Step F103 of FIG. 12.

Regarding the gesture operation, when a certain user constantly uses the input apparatus, it is also suitable to set in advance the thresholds th3 and th4 in accordance with a body temperature of the user as described above to improve the accuracy.

Although the thresholds th3 and th4 are values calculated from the target temperature Tg, fixed values, which are values defining the temperature range smaller than that defined by the thresholds th1 and th2, may be used as the thresholds th3 and th4. For example, when a temperature of the user's hand as a detection target falls within the range defined by the thresholds th3 and th4, a process such as switching to the use of the thresholds th3 and th4 may be executed.

7. Fifth Embodiment

Figure 21A:
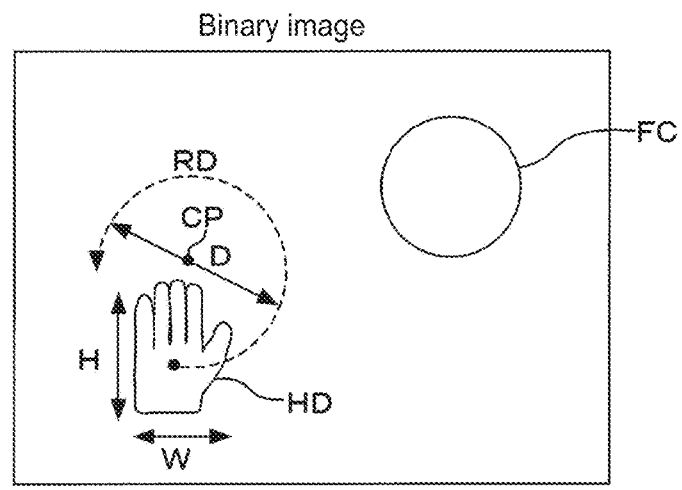
FIG. 21 are explanatory diagrams illustrating setting of a detection target range according to a fifth embodiment.
Figure 21B:
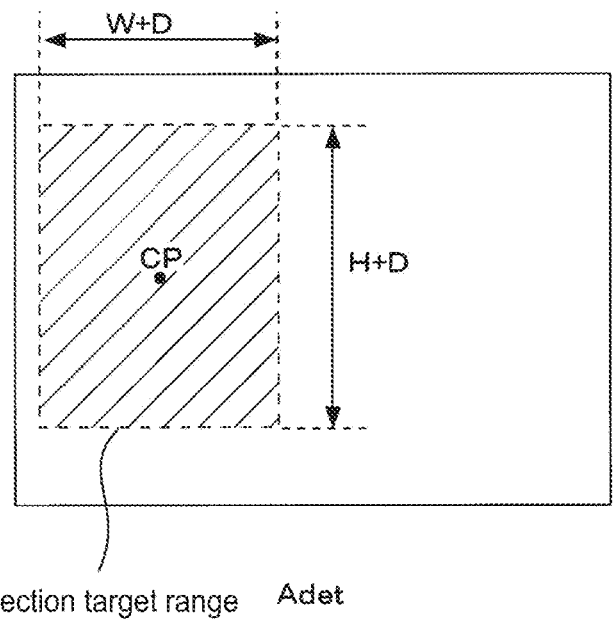
Figure 22:
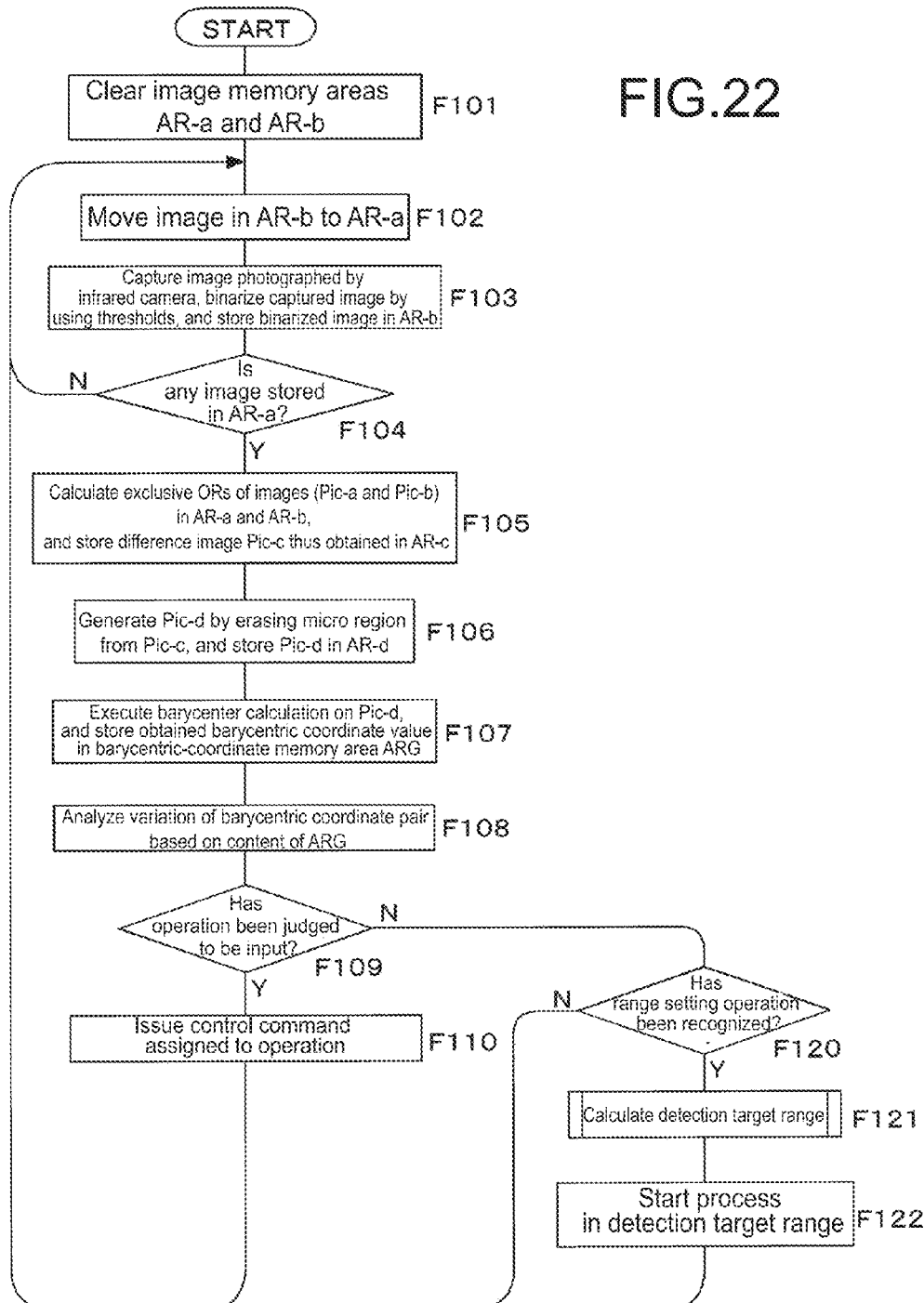
FIG. 22 is a flowchart of an input recognition process according to the fifth embodiment.
Figure 23:
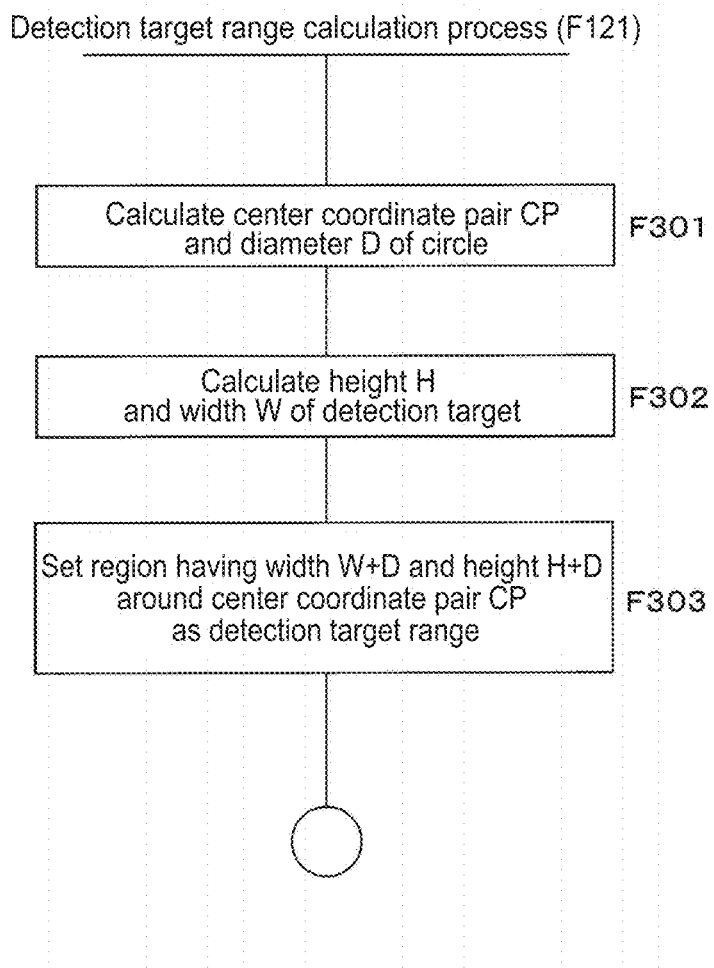
FIG. 23 is a flowchart of a calculation process for the detection target range according to the fifth embodiment.

Description is made of a process according to a fifth embodiment with reference to FIGS. 21, 22, and 23. The fifth embodiment illustrates an example in which, in a case where the CPU 2 (input recognition unit 12) has detected particular motions of detection target images, the CPU 2 sets a detection target range based on where the detection target images showing the particular motions have been located in temperature distribution images and binary images. Subsequently, the detection target images are detected in this detection target range.

FIG. 21 illustrates the example of the fifth embodiment. FIG. 21A shows a state in which the region HD corresponding to a part of the hand of a user and the region FC corresponding to a part of the face of the user appear in a binary image.

Here, it is assumed that, during an input recognition process, the user makes a motion of drawing a circle as indicated by a broken-line arrow RD as a particular motion corresponding to a range setting operation.

In a case where such a particular motion has been detected, a detection target range Adet is set as illustrated in FIG. 21B based on the position of the motion in images.

Subsequently, detection of the detection target images and judgment on motion states are performed in this detection target range Adet.

FIG. 22 shows a processing example of the CPU 2. Note that, Steps F101 to F110 are the same as those in FIG. 12, and hence description thereof is omitted.

The process of FIG. 22 is basically the same as that of FIG. 12 except that, for example, the gesture of drawing a circle as illustrated in FIG. 21 above is preset as a particular gesture. Then, when the user makes this particular gesture, the detection target range Adet is set.

In other words, in a case where a motion has been recognized as the gesture operation by judgment of states of motions of detection target images in Step F108, not only does the CPU 2 advance the process from Step F109 to Step F110 to issue a corresponding command, but also judge, by the motion judgment in Step F108 of this example, whether or not the motion corresponds to the "particular gesture" of drawing, for example, a circle as the range setting operation in addition to whether or not the motion corresponds to the gesture operation.

Then, in a case where the particular gesture as the range setting operation has been recognized, the process proceeds from Step F120 to Step F121, and the CPU 2 executes a processing content of calculating the detection target range Adet.

FIG. 23 shows an example of the process of calculating the detection target range Adet in Step F121.

When the user makes the motion of drawing a circle as indicated by the broken-line arrow RD in FIG. 21A, in response thereto, in Step F301, the CPU 2 calculates a center coordinate pair CP and a diameter D of the circle in the image.

Note that, barycentric coordinate pairs of the images of the hand in the frames are obtained in Step F107 of FIG. 22, and sequentially stored in the barycentric-coordinate memory area ARG. Thus, in Step F108 of FIG. 22, a gesture of drawing a circle can be recognized based on variation of barycentric coordinate values (directions of motion vectors). Further, in Step F301 of FIG. 23, the center coordinate pair CP and the diameter D of the circle formed along a locus of the barycentric coordinate pairs stored in the barycentric-coordinate memory area ARG can be calculated based on the barycentric coordinate values.

Next, in Step F302, the CPU 2 calculates a height H and a width W of the detection target (hand). The height H and the width W of the detection target can be calculated based on pixel numbers in a height direction and a width direction of the hand part in a binary image of a certain frame.

Then, in Step F303, the CPU 2 sets a range defined by a width W+D and a height H+D around the center coordinate pair CP as the detection target range Adet. In other words, as illustrated in FIG. 21B, the detection target range Adet corresponds to a range in which the images of the hand are normally likely to be photographed.

After the detection target range Adet has been calculated as described above in Step F121 of FIG. 22, in Step F122, the CPU 2 starts an input recognition process limited within the detection target range Adet, and then executes the processing contents of Step F102 and subsequent Steps.

Thus, subsequently, the processing contents of from Steps F102 to F108 are executed only in the detection target range Adet.

Specifically, binary images corresponding to the detection target range Adet are generated. Then, a difference image of the plurality of binary images is generated, and micro regions are erased from the difference image. In this way, a detection target image is specified, and a barycentric position thereof is stored. After that, a state of a motion of the detection target image is judged based on how the barycentric positions have varied.

Note that, the binary image may be generated over the entire screen as usual, and then the difference image Pic-c may be generated only in the detection target range Adet.

According to the processing example as described above, input recognition is performed while a range in which gesture operations performed with the hand of a user are located is limited in each photographed images. Thus, the face part and other objects are more likely to be excluded at the time of performing the input recognition, and hence the gesture operations can be recognized with higher accuracy.

Note that, in the example described above, during the input recognition process of FIG. 22, the detection target range Adet is set in accordance with a particular gesture made by a user. However, the detection target range Adet may be set, for example, with a setting mode independent of the input recognition process.

Specifically, in a state of the setting mode, the user had to make a particular gesture, and then the CPU 2 recognizes the particular gesture and executes the subroutine as shown in FIG. 23. In this way, the detection target range Adet may be set. Subsequently, the input recognition process may be executed in the detection target range Adet, and the detection target range Adet may be activated by an operation of the user.

Further, as a matter of course, the particular gesture includes other various gestures than the gesture of drawing a circle.

Still further, the method of setting the detection target range Adet includes other various methods.

For example, a user had to make a "particular gesture" of moving his/her hand in a quadrangular or circular fashion, and a range in an image, which is somewhat larger than an outer rim of a moving locus of such a gesture, may be set as the detection target range Adet.

8. Sixth Embodiment

Description is made of a sixth embodiment with reference to FIG. 24 and FIG. 25. In an example of the sixth embodiment, the CPU 2 (input recognition unit 12) executes a process of outputting a message in a case where the skin temperature image portions, from among which a motion is observed with reference to the difference image, have not been detected within a predetermined time period.

Figure 24A:
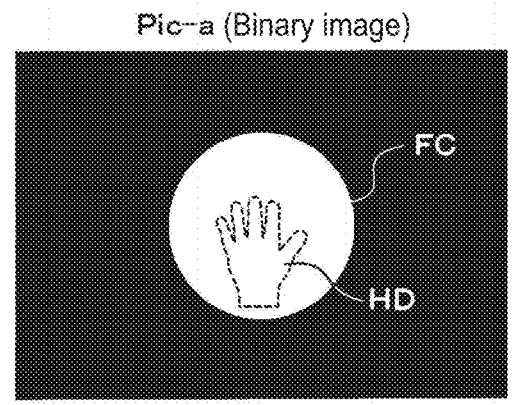
FIG. 24 are explanatory diagrams illustrating a case according to a sixth embodiment, where it is difficult to recognize a detection target image in a difference image.
Figure 24B:
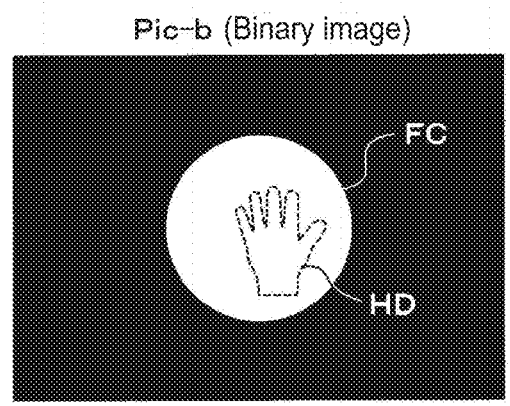

FIGS. 24A and 24B respectively show the binary images Pic-a and Pic-b of certain successive frames. In this case, original photographed images contain the face and the hand of a user, and the region HD corresponding to a part of the hand of the user and the region FC corresponding to a part of the face of the user appear in each of the binary images Pic-a and Pic-b. However, as illustrated in FIGS. 24A and 24B, the hand region HD overlaps the face region FC, and hence it is difficult to extract the hand region HD alone. In other words, a motion of the hand is hidden by the face region FC therebehind, and hence it is difficult to detect the motion of the hand.

Figure 24C:
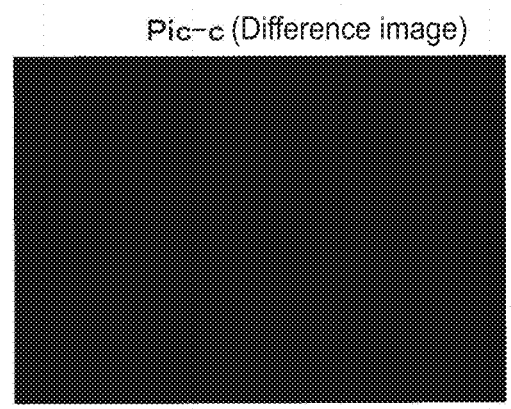

In this state, as illustrated in FIG. 24C, it is difficult for the CPU 2 to detect difference pixels corresponding to the motion from the difference image Pic-c of the binary images Pic-a and Pic-b.

Such a situation may occur when the user performs a gesture operation of moving his/her hand in front of his/her face. During such a situation, it is difficult to accurately detect gesture operations.

As a countermeasure, in such a situation, the CPU 2 executes the process of outputting a message to the user.

For example, as a subroutine of Step F105 in FIG. 12, the CPU 2 executes processing contents as shown in FIG. 25.

In FIG. 12, when the process proceeds to Step F105, the binary images Pic-a and Pic-b have been stored respectively in the image memory areas AR-a and AR-b and the difference image Pic-c thereof is generated.

In this case, in Step F401 of FIG. 25, the CPU 2 confirms whether or not the skin temperature image portions exist in each of the binary images Pic-a and Pic-b. The skin temperature image portions correspond to regions each formed of pixels of "1" obtained through the binarization with respect to the thresholds th1 and th2.

In a case where the skin temperature image portions have not existed in at least one of the binary images Pic-a and Pic-b, it is unnecessary to generate the difference image Pic-c, and hence the process returns to Step F102 of FIG. 12.

In a case where the skin temperature image portions exist in each of the binary images Pic-a and Pic-b, the CPU 2 advances the process to Step F402, and calculates the exclusive ORs of the pixels of each of the binary images Pic-a and Pic-b so as to generate the difference image Pic-c.

In this case, in Step F403, the CPU 2 confirms whether or not an effective difference image Pic-c has been generated. The effective difference image refers to a difference image in which skin temperature image portions showing a motion exist. For example, when successive regions corresponding to the pixels of "1," which occupy an area equal to or larger than a predetermined area, exist in the difference image Pic-c, it is judged that the effective difference image Pic-c has been generated. Meanwhile, as illustrated in FIG. 24C, when the pixels of "1" do not exist or scarcely exist, it is judged that the effective difference image Pic-c has not been generated.

In a case where the effective difference image Pic-c has been obtained, the CPU 2 advances the process to Step F404, and stores the effective difference image Pic-c in the image memory area AR-c. In this way, the subroutine of Step F105 of FIG. 12 is completed, and the process proceeds to Step F106.

Meanwhile, in a case where generation of the effective difference image Pic-c has been failed, the CPU advances the process to Step F405 so as to increment a variable CT which is a count of how many times ineffective difference images are successively generated.

Then, in Step F406, the CPU 2 judges whether or not the variable CT is equal to or larger than a count threshold CTth. In a case where CT<CTth has been satisfied, the CPU 2 advances the process directly to Step F102 of FIG. 12.

During the process of FIG. 12, which is executed every time the frames of the photographed images from the infrared camera 1 are captured, at a certain time point, it is judged the variable CT is equal to or larger than the count threshold CTth in Step F406 in a case where generation of the effective difference images Pic-c has been failed for a long time period despite of existence of the skin temperature image portions in the binary images.

In this case, the CPU 2 advances the process from Step F406 to Step F407 so as to control message indication. In other words, in the situation described with reference to FIG. 24, the CPU 2 estimates that a gesture operation has not been satisfactorily detected, and then make the main function unit 6 perform output of a message such as "Change the position of the hand making a gesture operation." The CPU 2 may effectly control such that the message indication is executed for a fixed time period, for example.

Then, in Step F408, the CPU 2 resets the variable CT to zero, and returns the process to Step F102 of FIG. 12.

By executing such a process, in a case where gesture operations have not been detected over a long time period, for example, depending on the position of the hand of the user, it is possible to request the user to correct the position of performing the gesture operation. For example, when the user lowers the position of his/her hand in accordance with the message indication, the effective difference images Pic-c can be obtained thereafter. As a result, gesture operations can be correctly recognized.

In the processing example describe above, a message for requesting the user to change the gesture position is indicated. In this context, the message may be indicated at other various timings and in other various conditions.

For example, even when there is a person in front of the television receiver 20 and skin temperature image portions of the person appear in binary images, in a case where the person has not performed any gesture operation at all, it may be judged that the difference images Pic-c have not been obtained over a long time period.

As a countermeasure, a message may be indicated in a case where no gesture operation have been detected over a predetermined time period despite a state in which the television receiver 20 has been in a mode of waiting gesture operations.

Alternatively, for example, with focus on the fact that parts other than the hand, such as the face, move to some extent in a case where any gesture operation has been performed, there may be employed a method in which a difference image Pic-c, in which the motion of the hand does not appear while slight motions appear at parts corresponding to the face, is judged as an ineffective difference image Pic-c.

In other words, it is appropriate to indicate a message, for example, in a case where it is difficult to detect the motion of the hand despite of the assumption that any gesture operation has been performed.

9. Seventh Embodiment

Figure 26A:
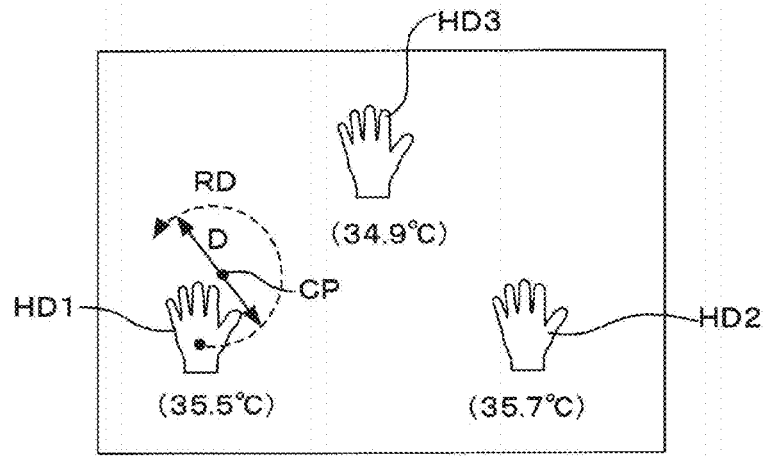
FIG. 26 are explanatory diagrams illustrating a process according to a seventh embodiment, in a case where a plurality of detection target images exist.
Figure 26B:
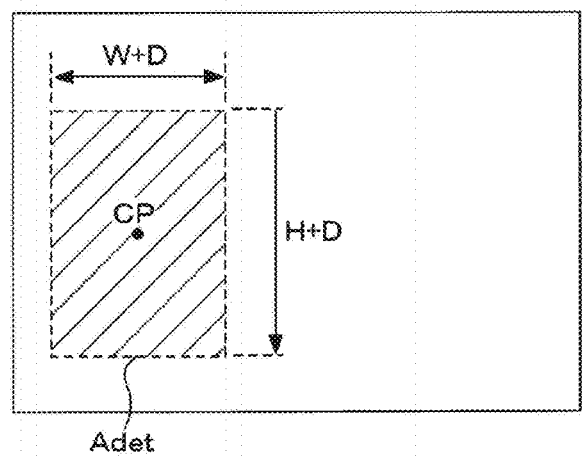
Figure 26C:
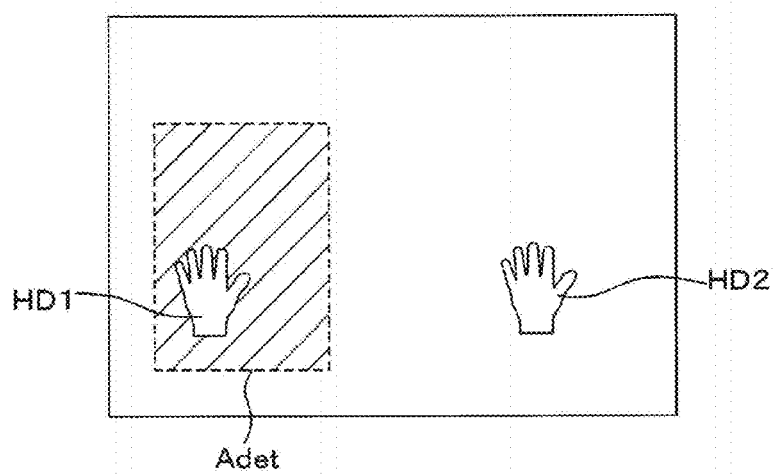
Figure 27:
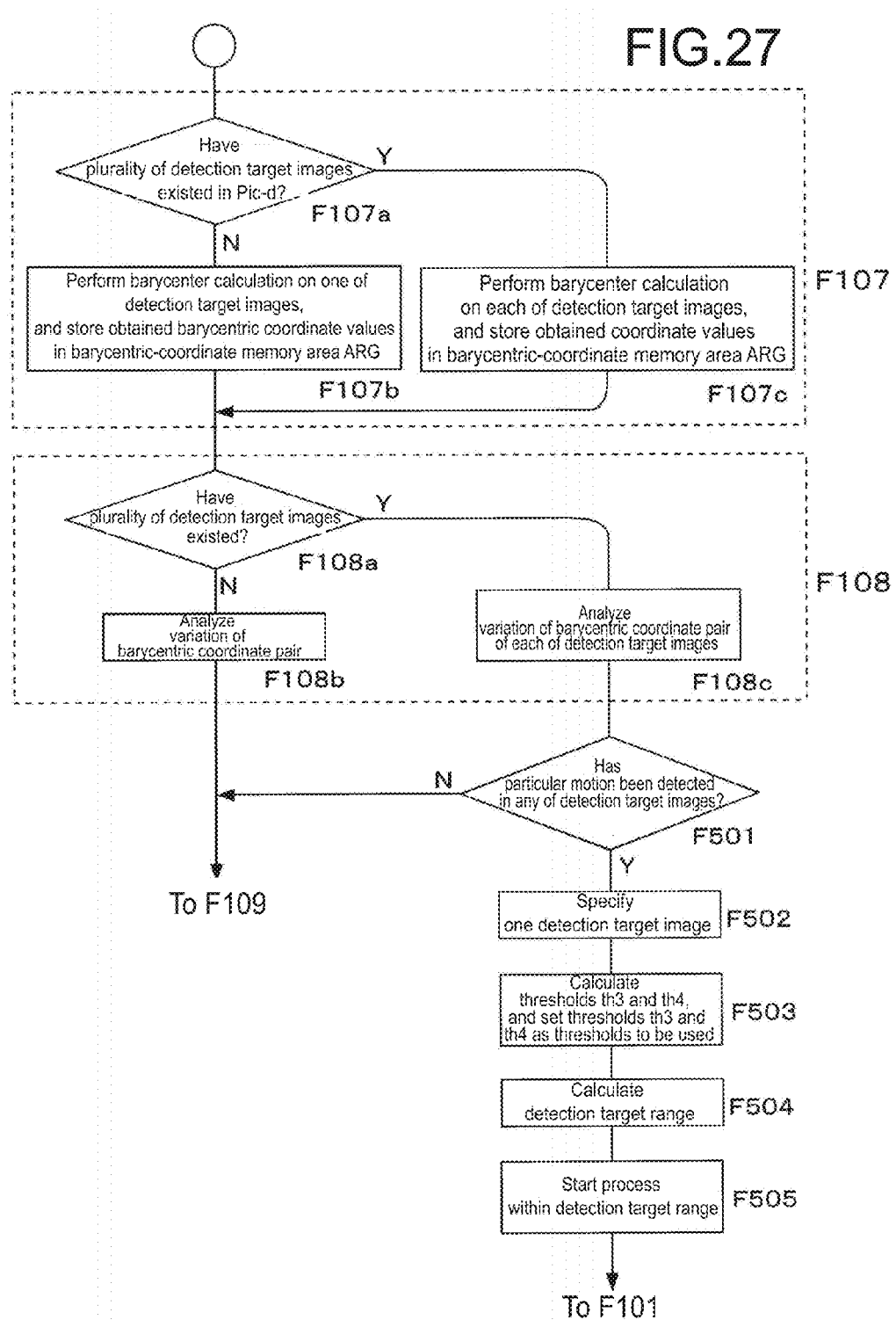
FIG. 27 is a flowchart showing an input recognition process according to the seventh embodiment.

Description is made of a seventh embodiment with reference to FIGS. 26 and 27.

In an example of the seventh embodiment, in a case where a plurality of detection target images have been obtained, the CPU 2 (input recognition unit 12) selects one detection target image, sets a detection condition corresponding to the selected one detection target image, and detects subsequent detection target images based on the detection condition.

For example, as the detection condition, there may be used at least one of a condition of a temperature range (temperature condition) which has been set in accordance with a temperature of the selected one detection target image, and a condition of the detection target range Adet (position condition) which has been set based on an image position of the selected one detection target image.

Further, in the case where a plurality of detection target images have been obtained, the CPU 2 (input recognition unit 12) selects, from among the plurality of detection target images, an image corresponding to a particular motion as one detection target image.

FIG. 26 show a summary of the example of the seventh embodiment.

For example, on the assumption that there are three persons in front of the television receiver 20, and, as illustrated in FIG. 26A, a region HD1, a region HD2, and a region HD3 of the respective hands of the three persons appear as skin temperature image portions, for example, in a binary image.

Note that, respective temperatures of the hands of the three persons are 35.5° C. (region HD1), 35.7° C. (region HD2), and 34.9° C. (region HD3).

As described above, in a case where the hands of the plurality of persons have been photographed, it is necessary to recognize a gesture operation by specifying which of the hands has made a motion corresponding to the gesture operation.

Thus, in this example, a gesture operation is recognized by detecting a motion of a person (hand) as an operator who has performed a gesture operation corresponding to a preset particular motion (particular gesture).

For example, a gesture of drawing a circle as indicated by the broken-line arrow RD as illustrated in FIG. 26A is set as the particular gesture.

In a case of having detected such a particular gesture, with respect to the temperature of the hand, the CPU 2 sets the thresholds th3 and th4 for binarization, and sets the detection target range Adet as illustrated, for example, in FIG. 26B. The detection target range Adet is set by, for example, the same process as that described in the fifth embodiment.

Subsequently, the gesture operation is recognized by specifying one detection target image corresponding to the particular gesture operation based on the temperature condition determined by the thresholds th3 and th4 and the condition of the position in the detection target range Adet in the binary image.

For example, as the temperature condition, when the threshold th3 is set to 35.0° C. and the threshold th4 is set to 36.0° C., the hand images of the regions HD1 and HD2 in FIG. 26A satisfy the temperature condition. In other words, when binarization is performed with respect to the thresholds th3 and th4, as illustrated in FIG. 26C, the hand images of the regions HD1 and HD2 are extracted in the binary image. Further, when detection is performed within the detection target range Adet as the position condition, only the hand image of the region HD1 appears. In such a situation, the CPU 2 recognizes the gesture operation by detecting a state of a motion of the image of the region HD1.

Note that, it is not necessary for the plurality of detection target images to be specified based on both the temperature condition and the condition of the position in the image.

FIG. 27 specifically shows the processing example of the CPU 2. FIG. 27 shows a modification of the process of FIG. 12, specifically, shows Steps F107 and F108 of FIG. 12, and Steps F501 to F505 added as a subroutine to Steps F107 and F108. Description thereof is made with reference also to FIG. 12.

The CPU 2 executes Steps F101 to F106 of FIG. 12 as described above. Note that, the thresholds th1 and th2 are set as original thresholds to be used in Step F103.

After generating the difference image Pic-d by erasing micro regions in Step F106, the CPU 2 executes barycenter calculation on detection target images in Step F107.

In this example, Step F107 described above is executed as shown in FIG. 27.

First, in Step F107a, the CPU 2 confirms whether or not a plurality of detection target images have existed in the difference image Pic-d from which micro regions have been erased.

In a case where only one detection target image has existed, the CPU 2 advances the process to Step F107b to execute barycenter calculation on the one detection target image, and stores coordinate values obtained through the barycenter calculation in the barycentric-coordinate memory area ARG. This processing content is the same as that described as the processing content of Step F107 of FIG. 12.

Meanwhile, in the case where a plurality of detection target images have existed, the CPU 2 advances the process to Step F107c to execute barycenter calculation on each of the plurality of detection target images, and stores coordinate values obtained through the barycenter calculation in the barycentric-coordinate memory area ARG. Note that, in the barycentric-coordinate memory area ARG, a plurality of storage regions are prepared so that the coordinate values corresponding to the plurality of detection target images can be sequentially stored at each time frame. For example, the storage regions as shown in FIG. 6B are prepared in a plurality of units corresponding to the number of the plurality of detection target images.

In subsequent Step F108 of FIG. 12, the CPU 2 analyzes variation of the barycentric coordinate pair based on the contents of the barycentric-coordinate memory area ARG so as to judge states of motions of the detection target images. In this example, in Step F108, the CPU 2 executes the subroutine shown in FIG. 27.

First, in Step F108a, the CPU 2 branches the process based on whether or not a plurality of detection target images have existed. In a case where only one detection target image has existed, in Step F108b, the CPU 2 analyzes the motion state based on a series of barycentric coordinate values stored in the barycentric-coordinate memory area ARG. This processing content is the same as that described with reference to FIG. 12.

In a case where a motion corresponding to any gesture operation is detected by this processing content, the CPU 2 advances the process from Step F109 to Step F110 of FIG. 12 so as to issue a corresponding control command to the main function unit 6.

Meanwhile, in a case where a plurality of detection target images have existed and a series of barycentric coordinate values of each of the plurality of detection target images have been stored in the barycentric-coordinate memory area ARG, the CPU 2 advances the process from Step F108a to Step F108c so as to judge motion states by analyzing variation of the barycentric coordinate pairs of each of the plurality of detection target images.

Judgment of the motion states in this case is based on whether or not the above-mentioned particular gesture of drawing a circle has been made.

In a case where the particular motion (particular gesture) has not been detected from any of the plurality of detection target images, the process proceeds from Step F501 to Step F109 of FIG. 12, and then returns to Step F102.

When the process of FIG. 12 (and FIG. 27) is repeated on the frames sequentially supplied from the infrared camera 1, in Step F501, it may be judged that, at a certain time point, a particular motion has been made.

As an example of such a case, there is illustrated a case where, as illustrated in FIG. 26A, three photographed hand images have appeared as parts corresponding to motions (in other words, detection target images) in the difference image Pic-d from which micro regions have been erased. In Step F107c described above, the barycentric coordinate pairs of each of the detection target images in a processing period for each of the frames are calculated and stored.

At a time point when a necessary number of barycentric coordinate values of each of the detection target images are stored in the barycentric-coordinate memory area ARG, it may be judged that a motion state of one of the detection target images has corresponded to a motion of drawing a circle.

For example, when a user corresponding to the hand image of the region HD of FIG. 26A draws a circle with his/her hand, the particular gesture is detected through analysis in Step F108c at a certain time point.

In this case, the CPU 2 advances the process from Step F501 to Step F502 so as to specify one detection target image. In other words, an image corresponding to the region HD1 in the difference image Pic-d from which micro regions have been erased is specified as one detection target image.

Then, in Step F503, the CPU 2 calculates the thresholds th3 and th4 by using a temperature obtained based on a temperature distribution image corresponding to the region HD1 (temperature of the hand corresponding to the region HD1). For example, it suffices that, as described in the fourth embodiment, the thresholds th3 and th4 are determined by calculation as follows: Threshold th3=Tg−Td; Threshold th4=Tg+Td, where the target temperature Tg represents a temperature value corresponding to the region HD1. After the thresholds th3 and th4 have been determined, these thresholds th3 and th4 are set as thresholds to be used in Step F103 of FIG. 12 instead of the thresholds th1 and th2.

Further, in Step F504, the CPU 2 calculates the detection target range Adet. In order to calculate the detection target range Adet, it suffices that the subroutine of FIG. 23 described in the fifth embodiment is executed.

After the detection target range Adet has been calculated, in Step F505, the CPU 2 starts the input recognition process within the detection target range Adet, and then returns the process Step F101 of FIG. 12.

After the processing contents of Steps F502 to F505 have been completed, even when a plurality of detection target images are detected, one of the plurality of detection target images is specified as one detection target image, and monitoring of gesture operations is continued.

In other words, when the binary image is generated based on the temperature condition defined by the threshold th3 (for example, 35.0° C.) and the threshold th4 (for example, 36.0° C.), in the case of FIG. 26A, a part corresponding to the region HD3 is excluded without appearing as a skin temperature image portion in the binary image.

Further, when the difference image Pic-c is generated in the detection target range Adet as illustrated in FIG. 26B, components of a motion of a part corresponding to the region HD2 are excluded from the difference images Pic-c and Pic-d. Consequently, in Step F107, the processing content of Step F107b is executed with respect to the part corresponding to the region HD1, and in Step F108, the processing content of Step F108b is executed with respect thereto.

In this way, a motion of the hand of a certain user who has made earlier a particular gesture is monitored, and subsequent gesture operations are recognized.

As described above in this example, in a case where there are a plurality of persons in front of the television receiver 20, gesture operation recognition is performed by specifying the hand of a person who has made a particular gesture. Thus, only the gesture operation of an operator can be accurately detected while recognition processes are prevented from being made instable by various motions of the plurality of persons.

Note that, as a matter of course, the particular gesture is not limited to the motion of drawing a circle.

Further, after one detection target image has been specified and the temperature condition and the position condition have been set once, this state may be continued until a single gesture operation has been completed, or may be continued for a certain time period.

In order to treat gesture operations of a plurality of persons, it is suitable to cancel the temperature condition and the position condition after a single gesture operation has been completed.

Meanwhile, if a certain user successively performs gesture operations, it is suitable to continue, for a certain time period, the temperature condition and the position condition which have been set correspondingly to a temperature or a position of a hand of the certain user.

Alternatively, the temperature condition and the position condition may be cancelled when the television receiver 20 is turned off.

Still alternatively, the temperature condition and the position condition may be cancelled when an operator issues a cancellation instruction by making another particular gesture (for example, gesture of drawing a reverse circle) that has been set to be recognized as the cancellation instruction.

Yet alternatively, the temperature condition and the position condition may be newly set by detecting a particular gesture made with the hand of another person.

Note that, in the example described above, although an AND condition of the temperature condition and the position condition is employed as the detection condition, there may be provided a processing example in which only one of the temperature condition and the position condition is set as the detection condition.

Further, although the image of the hand of a user who has made a particular gesture is regarded as one detection target image, other various specification methods may be employed.

For example, there may be employed a specification method including, specifying, from among a plurality of detection target images, a detection target image from which a motion corresponding to a certain gesture operation has been observed first as an image of the hand of an operator, issuing a command corresponding to the gesture operation in response thereto, and setting, correspondingly to image parts of the detection target image, conditions such as Steps F503 to F505 of FIG. 27 for subsequent processes.

Alternatively, in a case where a plurality of skin temperature image portions have appeared in a binary image, an image region in which a motion has been detected first (region in the difference image Pic-c, in which a motion has been detected first) may be specified as a detection target image, and conditions such as Steps F503 to F505 of FIG. 27 may be set correspondingly to image parts of the detection target image.

Still alternatively, in the case where a plurality of skin temperature image portions have appeared in a binary image, an image region in which the largest amount motion has been detected (region in the difference image Pic-c, in which the largest amount motion has been observed) may be specified as a detection target image, and the conditions such as Steps F503 to F505 of FIG. 27 may be set correspondingly to image parts of the detection target image.

10. Modifications

In addition to the processing examples of the various embodiments, which have been described hereinabove, there may be provided further various processing examples.

In the processing example of FIG. 12 described in the first embodiment, after the difference image Pic-c has been generated, the difference image Pic-d is generated by erasing micro regions from the difference image Pic-c, and a barycenter of the difference image Pic-d is calculated. In contrast, a barycenter may be calculated based on the difference image Pic-c without executing the process of erasing the micro regions. For example, the regions of "1," which occupy an area equal to or larger than a predetermined area, may be treated as a detection target image, and barycentric coordinate values of the detection target image may be calculated.

Further, motion states are judged based on variation of barycentric coordinate pair of a part corresponding to the hand. However, alternatively, for example, motion states may be judged based on variation of a center coordinate pair of positions of the pixels "1" in the difference image Pic-c (or Pic-d), or on positional variation of image edge parts.

Still further, in each of the examples of the embodiments, the process is executed per capture of one frame of each of the photographed images from the infrared camera 1. However, alternatively, the process may be intermittently executed per capture of, for example, every n frames of the photographed images.

Yet further, in each of the examples of the embodiments, recognition of gesture operations is performed with respect to the hand of a user. However, it is not necessary to perform the recognition with respect to the hand. As a matter of course, gesture operations may be recognized based on, for example, a motion of the face.

The embodiments have been described by way of an example of the input apparatus 10 mounted to the television receiver 20. However, the input apparatus and the input recognition method according to the embodiments of the present disclosure are applicable to various electronic apparatuses. Specifically, the input apparatus and the input recognition method according to the embodiments of the present disclosure are applicable to, for example, video apparatuses, audio apparatuses, camera apparatuses, computer apparatuses, communication apparatuses, and home electric appliances.

Further, the input apparatus according to the embodiments of the present disclosure may be configured as an independent apparatus connected to other apparatuses.

In addition, temperature distribution images are obtained from the infrared camera 1, and hence it is possible to detect whether or not a temperature of the skin of a user is higher than usual. For example, in a case where a fifth threshold has been set and the temperature of the skin of the user is higher than the fifth threshold, it is possible to execute an operation of notifying a health risk.

Note that, the present disclosure may also employ configurations as follows:

(1) An input apparatus, including:
an infrared camera;
an image capture unit configured to sequentially capture a plurality of temperature distribution images photographed at predetermined time intervals by the infrared camera; and
an input recognition unit configured
to detect, from among the plurality of temperature distribution images captured by the image capture unit, pairs of skin temperature image portions each corresponding to a temperature of skin of a person,
to recognize, from among the pairs of skin temperature image portions thus detected, pairs of skin temperature image portions as pairs of detection target images, from among which motions are observed, and
to recognize an operation input based on states of the motions of the pairs of detection target images.

(2) The input apparatus according Item (1), in which the input recognition unit detects the pairs of skin temperature image portions from among the plurality of temperature distribution images by comparing temperature values of pixels of each of the plurality of temperature distribution images with each other with respect to a first threshold and a second threshold which are set to define a temperature range of the skin of the person.

(3) The input apparatus according Item (2), in which the input recognition unit
generates a pair of binary images each containing the pairs of skin temperature image portions by binarizing the plurality of temperature distribution images based on whether or not the temperature values of the pixels of each of the plurality of temperature distribution images fall within the temperature range defined by the first threshold and the second threshold,
generates a difference image of the pairs of detection target images in the pairs of skin temperature image portions, from among which the motions are observed, by determining a difference between the pair of binary images of the plurality of temperature distribution images, and
judges, by using the difference image, the states of the motions of the pairs of detection target images.

(4) The input apparatus according Item (3), in which the input recognition unit erases image parts corresponding to the pairs of skin temperature image portions in each of which the motion has been judged to be slight from the difference image to obtain a detection target image.

(5) The input apparatus according to Item (3) or (4), in which the input recognition unit
calculates a position of a feature point of the detection target image based on the difference image, and
judges a state of a motion of the detection target image based on variation of the position of the feature point.

(6) The input apparatus according to any one of Items (1) to (5), in which the predetermined time interval includes one frame interval of a photographing operation of the infrared camera.

(7) The input apparatus according to any one of Items (1) to (6), in which the input recognition unit selects a detection target image based on which of the pairs of skin temperature image portions occupies an area equal to or larger than a predetermined area.

(8) The input apparatus according to any one of Items (1) to (7), in which the input recognition unit executes a recognition process of the operation input provided that a positional variation by a predetermined amount or larger, which shows at least one of the states of the motions of the pairs of detection target images, is detected predetermined times or more.

(9) The input apparatus according to any one of Items (2) to (5), in which the input recognition unit
detects the pairs of skin temperature image portions from among the plurality of temperature distribution images by comparing the temperature values of the pixels of each of the plurality of temperature distribution images with each other with respect to the first threshold and the second threshold which are set to define the temperature range of the skin of the person, and after that, sets a third threshold and a fourth threshold which are set to define a temperature range smaller than the temperature range defined by the first threshold and the second threshold based on the temperature values of the pairs of skin temperature image portions recognized as the pairs of detection target images, and detects subsequent pairs of skin temperature image portions from among the plurality of temperature distribution images by using the third threshold and the fourth threshold.

(10) The input apparatus according to any one of Items (1) to (9), in which, in a case where a particular motion has been detected from among the pairs of detection target images, the input recognition unit sets a detection target range based on image positions of the pairs of detection target images in a middle of showing the particular motion, and detects subsequent pairs of skin temperature image portions from the detection target range.

(11) The input apparatus according to any one of Items (3) to (5), in which the input recognition unit executes a process of outputting a message in a case where the pairs of skin temperature image portions, from among which a motion is observed with reference to the difference image, have not been detected within a predetermined time period.

(12) The input apparatus according to any one of Items (1) to (11), in which, in a case where a plurality of detection target images have been obtained, the input recognition unit selects one detection target image from among the plurality of detection target images, sets a detection condition corresponding to the selected one detection target image, and detects subsequent detection target images based on the detection condition.

(13) The input apparatus according Item (12), in which the detection condition includes at least one of a condition of a temperature range which has been set in accordance with a temperature of the selected one detection target image, and a condition of a detection target range which has been set based on an image position of the selected one detection target image.

(14) The input apparatus according to Item (12) or (13), in which, in the case where a plurality of detection target images have been obtained, the input recognition unit selects, from among the plurality of detection target images, an image corresponding to a particular motion as one detection target image.

(15) The input apparatus according to any one of Items (1) to (14), further including an apparatus control unit configured to effectively control in response to the operation input recognized by the input recognition unit.

(16) An input recognition method, including:

sequentially capturing a plurality of temperature distribution images photographed at predetermined time intervals by an infrared camera;

detecting, from among the plurality of temperature distribution images thus captured, pairs of skin temperature image portions each corresponding to a temperature of skin of a person;

recognizing, from among the pairs of skin temperature image portions thus detected, pairs of skin temperature image portions as pairs of detection target images, from among which motions are observed; and recognizing an operation input based on states of the motions of the pairs of detection target images.

It should be understood by those skilled in the art that various modifications, combinations, sub-combinations and alterations may occur depending on design requirements and other factors insofar as they are within the scope of the appended claims or the equivalents thereof.

The application is claimed as follows:

1. An input apparatus, comprising:
an infrared camera;
an image capture unit configured to sequentially capture a plurality of temperature distribution images photographed at predetermined time intervals by the infrared camera; and
an input recognition unit configured
to detect, from among the plurality of temperature distribution images captured by the image capture unit, pairs of skin temperature image portions each corresponding to a temperature of skin of a person,
to recognize, from among the pairs of skin temperature image portions detected, pairs of skin temperature image portions as pairs of detection target images, from among which motions are observed, and
to recognize an operation input based on states of the motions of the pairs of detection target images,
wherein the input recognition unit is configured to detect the pairs of skin temperature image portions from among the plurality of temperature distribution images by comparing temperature values of pixels of each of the plurality of temperature distribution images with each other with respect to a first threshold and a second threshold which are set to define a temperature range of the skin of the person, and
wherein the input recognition unit is further configured to generate a pair of binary images each containing the pairs of skin temperature image portions by binarizing the plurality of temperature distribution images based on whether or not the temperature values of the pixels of each of the plurality of temperature distribution images fall within the temperature range defined by the first threshold and the second threshold, generate a difference image of the pairs of detection target images in the pairs of skin temperature image portions, from among which the motions are observed, by determining a difference between the pair of binary images of the plurality of temperature distribution images, and judge, by using the difference image, the states of the motions of the pairs of detection target images.

2. The input apparatus according to claim 1, wherein the input recognition unit is further configured to erase image parts corresponding to the pairs of skin temperature image portions in each of which the motion has been judged to be different from the difference image to obtain a detection target image.

3. The input apparatus according to claim 2, wherein the input recognition unit is further configured to
calculate a position of a feature point of the pairs of detection target images based on the difference image, and
judge a state of a motion of the pairs of detection target images based on variation of the position of the feature point.

4. The input apparatus according to claim 1, wherein the predetermined time interval includes one frame interval of a photographing operation of the infrared camera.

5. The input apparatus according to claim 1, wherein the input recognition unit is further configured to select a detection target image based on which of the pairs of skin temperature image portions occupies an area equal to or larger than a predetermined area.

6. The input apparatus according to claim 1, wherein the input recognition unit executes a recognition process of the operation input provided that a positional variation by a predetermined amount or larger, which shows at least one of the states of the motions of the pairs of detection target images, is detected predetermined times or more.

7. The input apparatus according to claim 1, wherein the input recognition unit is further configured to
   detect the pairs of skin temperature image portions from among the plurality of temperature distribution images by comparing the temperature values of the pixels of each of the plurality of temperature distribution images with each other with respect to the first threshold and the second threshold which are set to define the temperature range of the skin of the person, and after that,
   set a third threshold and a fourth threshold which are set to define a temperature range smaller than the temperature range defined by the first threshold and the second threshold based on the temperature values of the pairs of skin temperature image portions recognized as the pairs of detection target images, and
   detect subsequent pairs of skin temperature image portions from among the plurality of temperature distribution images by using the third threshold and the fourth threshold.

8. The input apparatus according to claim 1, wherein, in a case where a particular motion has been detected from among the pairs of detection target images, the input recognition unit is configured to
   set a detection target range based on image positions of the pairs of detection target images in a middle of showing the particular motion, and
   detect subsequent pairs of skin temperature image portions from the detection target range.

9. The input apparatus according to claim 1, wherein the input recognition unit is configured to execute a process of outputting a message in a case where the pairs of skin temperature image portions, from among which a motion is observed with reference to the difference image, have not been detected within a predetermined time period.

10. The input apparatus according to claim 1, wherein, in a case where a plurality of detection target images have been obtained, the input recognition unit is configured to
    select one detection target image from among the plurality of detection target images,
    set a detection condition corresponding to the selected one detection target image, and
    detect subsequent detection target images based on the detection condition.

11. The input apparatus according to claim 10, wherein the detection condition includes at least one of a condition of a temperature range which has been set in accordance with a temperature of the selected one detection target image, and a condition of a detection target range which has been set based on an image position of the selected one detection target image.

12. The input apparatus according to claim 10, wherein in the case where a plurality of detection target images have been obtained, the input recognition unit selects, from among the plurality of detection target images, an image corresponding to a particular motion as one detection target image.

13. The input apparatus according to claim 1, further comprising an apparatus control unit configured to effectively control in response to the operation input recognized by the input recognition unit.

14. An input recognition method, comprising:
    sequentially capturing a plurality of temperature distribution images photographed at predetermined time intervals by an infrared camera;
    detecting, from among the plurality of temperature distribution images thus captured, pairs of skin temperature image portions each corresponding to a temperature of skin of a person;
    recognizing, from among the pairs of skin temperature image portions thus detected, pairs of skin temperature image portions as pairs of detection target images, from among which motions are observed; and
    recognizing an operation input based on states of the motions of the pairs of detection target images,
    in a case where a particular motion has been detected from among the pairs of detection target images, further comprising:
    setting a detection target range based on image positions of the pairs of detection target images in a middle of showing the particular motion, and
    detecting subsequent pairs of skin temperature image portions from the detection target range.

15. An input apparatus, comprising:
    an infrared camera;
    an image capture unit configured to sequentially capture a plurality of temperature distribution images photographed at predetermined time intervals by the infrared camera; and
    an input recognition unit configured
       to detect, from among the plurality of temperature distribution images captured by the image capture unit, pairs of skin temperature image portions each corresponding to a temperature of skin of a person,
       to recognize, from among the pairs of skin temperature image portions detected, pairs of skin temperature image portions as pairs of detection target images, from among which motions are observed, and
       to recognize an operation input based on states of the motions of the pairs of detection target images,
    wherein the input recognition unit is further configured to detect the pairs of skin temperature image portions from among the plurality of temperature distribution images by comparing the temperature values of the pixels of each of the plurality of temperature distribution images with each other with respect to the first threshold and the second threshold which are set to define the temperature range of the skin of the person, and after that,
    set a third threshold and a fourth threshold which are set to define a temperature range smaller than the temperature range defined by the first threshold and the second threshold based on the temperature values of the pairs of skin temperature image portions recognized as the pairs of detection target images, and
    detect subsequent pairs of skin temperature image portions from among the plurality of temperature distribution images by using the third threshold and the fourth threshold.

16. An input apparatus, comprising:
    an infrared camera;
    an image capture unit configured to sequentially capture a plurality of temperature distribution images photographed at predetermined time intervals by the infrared camera; and an input recognition unit configured
- to detect, from among the plurality of temperature distribution images captured by the image capture unit, pairs of skin temperature image portions each corresponding to a temperature of skin of a person,
- to recognize, from among the pairs of skin temperature image portions detected, pairs of skin temperature image portions as pairs of detection target images, from among which motions are observed, and
- to recognize an operation input based on states of the motions of the pairs of detection target images, wherein, in a case where a particular motion has been detected from among the pairs of detection target images, the input recognition unit is configured to set a detection target range based on image positions of the pairs of detection target images in a middle of showing the particular motion, and detect subsequent pairs of skin temperature image portions from the detection target range.

17. An input apparatus, comprising:

an infrared camera;

an image capture unit configured to sequentially capture a plurality of temperature distribution images photographed at predetermined time intervals by the infrared camera; and an input recognition unit configured
- to detect, from among the plurality of temperature distribution images captured by the image capture unit, pairs of skin temperature image portions each corresponding to a temperature of skin of a person,
- to recognize, from among the pairs of skin temperature image portions detected, pairs of skin temperature image portions as pairs of detection target images, from among which motions are observed, and
- to recognize an operation input based on states of the motions of the pairs of detection target images, wherein, in a case where a plurality of detection target images have been obtained, the input recognition unit is configured to select one detection target image from among the plurality of detection target images, set a detection condition corresponding to the selected one detection target image, and detect subsequent detection target images based on the detection condition.

* * * * *